(12) United States Patent
Chen et al.

(10) Patent No.: US 7,765,343 B2
(45) Date of Patent: Jul. 27, 2010

(54) METHOD AND SYSTEM FOR ROBUST ELASTIC FIFO (EFIFO) IN A PORT BYPASS CONTROLLER

(75) Inventors: Chung-Jue Chen, Irvine, CA (US); Ali Ghiasi, Cupertino, CA (US); Jay Proano, Rancho Santa Margarita, CA (US); Rajesh Satapathy, Lake Forest, CA (US); Steve Thomas, Riverside, CA (US)

(73) Assignee: Broadcom Corporation, Irvine, CA (US)

( * ) Notice: Subject to any disclaimer, the term of this patent is extended or adjusted under 35 U.S.C. 154(b) by 112 days.

(21) Appl. No.: 10/779,232

(22) Filed: Feb. 13, 2004

(65) Prior Publication Data

US 2005/0131987 A1 Jun. 16, 2005

Related U.S. Application Data

(60) Provisional application No. 60/529,143, filed on Dec. 12, 2003, provisional application No. 60/529,200, filed on Dec. 12, 2003, provisional application No. 60/529,145, filed on Dec. 12, 2003, provisional application No. 60/529,421, filed on Dec. 12, 2003.

(51) Int. Cl.
*G06F 3/00* (2006.01)
*G06F 5/00* (2006.01)
*G06F 11/00* (2006.01)
*G06F 7/02* (2006.01)

(52) U.S. Cl. .............. 710/52; 710/53; 710/54; 710/55; 710/56; 710/57; 714/704; 714/819

(58) Field of Classification Search ............. 710/52–57, 710/60; 714/704, 819
See application file for complete search history.

(56) References Cited

U.S. PATENT DOCUMENTS

| | | | | |
|---|---|---|---|---|
| 4,891,788 | A | * | 1/1990 | Kreifels ..................... 365/49 |
| 5,970,070 | A | * | 10/1999 | Ho et al. .................... 370/462 |
| 6,337,865 | B1 | * | 1/2002 | Seto et al. .................. 370/450 |
| 6,397,042 | B1 | * | 5/2002 | Prentice et al. ......... 455/67.14 |
| 6,442,708 | B1 | * | 8/2002 | Dierauer et al. ............. 714/25 |
| 6,529,971 | B1 | * | 3/2003 | Thiesfeld ................... 710/53 |
| 7,127,391 | B2 | * | 10/2006 | Chang et al. ............... 704/230 |
| 7,225,274 | B2 | * | 5/2007 | Heppenstall et al. ........ 709/249 |
| 2003/0016683 | A1 | * | 1/2003 | George et al. .............. 370/404 |
| 2004/0081186 | A1 | | 4/2004 | Warren et al. | |

OTHER PUBLICATIONS

"Fibre Channel Arbitrated Loop", 1999, pp. 3-4, 18-23, 30-48 and 103-107.*

* cited by examiner

*Primary Examiner*—Chun-Kuan Lee
(74) *Attorney, Agent, or Firm*—McAndrews, Held & Malloy

(57) ABSTRACT

Certain embodiments of the invention may be found in a method and system for handling data in port bypass controllers for storage systems and may comprise receiving a data stream from a receive port bypass controller's port and buffering at least a portion of the received data stream in at least one EFIFO buffer integrated within the port bypass controller. A data rate or frequency of the received data stream may be changed by inserting at least one extended fill word in the buffered portion of the received data stream or by deleting at least one fill word from the received data stream buffered in the EFIFO buffer. The extended fill word may comprise a loop initialization primitive (LIP), a loop port bypass (LPB), a loop port enable (LPE), a not operation state (NOS), an offline state (OLS), a link reset response (LRR) and/or a link reset (LR).

49 Claims, 22 Drawing Sheets

METHOD AND SYSTEM FOR ROBUST ELASTIC FIFO (EFIFO) IN A PORT BYPASS CONTROLLER

CROSS-REFERENCE TO RELATED APPLICATIONS/INCORPORATION BY REFERENCE

This application makes reference to, claims priority to, and claims the benefit of:
U.S. Provisional Application Ser. No. 60/529,143 filed Dec. 12, 2003;
U.S. Provisional Application Ser. No. 60/529,200 filed Dec. 12, 2003;
U.S. Provisional Application Ser. No. 60/529,145 filed Dec. 12, 2003; and
U.S. Provisional Application Ser. No. 60/529,421 filed Dec. 12, 2003.

This application also makes reference to:
U.S. Provisional application Ser. No. 10/779,234 filed Feb. 13, 2004;
U.S. Provisional application Ser. No. 10/779,001 filed Feb. 13, 2004;
U.S. Provisional application Ser. No. 10/779,233 filed Feb. 13, 2004;
U.S. Provisional application Ser. No. 10/797,729 filed Jan. 30, 2004; and
U.S. Provisional application Ser. No. 10/767,748 filed Jan. 30, 2004.

The above stated applications are hereby incorporated herein by reference in their entirety.

FIELD OF THE INVENTION

Certain embodiments of the invention relate to port bypass controllers. More specifically, certain embodiments of the invention relate to a method and system for robust EFIFO implementation in a port bypass controller.

BACKGROUND OF THE INVENTION

FIG. 1a is a block diagram 120 of a conventional networking environment illustrating the arrangements of various communication and storage entities. Referring to FIG. 1a, there is shown a wide area network (WAN) 110 comprising a plurality of local area networks (LANs) 102, 104, 106, 108 and a router 132. The LANs 102, 104, 106, 108 are coupled via the router 132. The LAN 102 comprises PCs 112, 116, 120, servers 126, 128 and data storage elements 114, 118, 122, 124 and 130.

The data storage element 114 may be coupled to the PC 112, the data storage element 118 may be coupled to the PC 116 and the data storage element 122 may be coupled to the PC 120. The data storage element 124 may be coupled to the server 126 and the data storage element 130 may be coupled to the server 128. The LANs 104, 106, 108 may also comprise a plurality of PCs, data storage elements and servers which may be configured in a somewhat similar manner as in LAN 102.

In operation, the PCs 112, 116, 120 may communicate with each other and with the servers 126, 128 via the LAN 102. The PCs 112, 116, 120 may communicate with communication entities coupled to the LANs 104, 106, 108 via the router 132. Additionally, the communication entities coupled to the LANs 104, 106, 108 may also communicate with the PCs 112, 116, 120, servers 126, 128, and the data storage elements 114, 118, 122, 124, 130 via the router 132.

A major drawback with the configuration of the conventional networking environment of FIG. 1a is that the bandwidth of the PC's connection or link to the LAN and the server's connection or link to the LAN may severely affect the performance of a communication network. Furthermore, the processing bandwidth of the PC's and the servers may further decrease system performance by introducing delays, which results in increased system latency. For example, it may be desirable for PC 112 to communicate with PC 120 in order to acquire information from the data storage element 122. Accordingly, if the network connections coupling the PC 112 and the PC 120 are slow, then these connections will limit communication between PC 112 and PC 120. Performance of the communication between PC 112 and PC 120 may be further limited or degraded in cases where the processing bandwidth for the PC 112 and PC 120 are low. Furthermore, during operation, multiple PCs may be attempting to communicate with the PC 120 in order to acquire information from the data storage element 120 while the PC 112 is simultaneously communicating with the PC 120. In this regard, as the number of communication entities attempting to acquire information from the data storage element 122 increases, the limited processing bandwidth and communication bandwidth of the PC 112 and the PC 120 may result in further delays and increased latency. The PCs 112, 116, 120, therefore, become bottlenecks.

In another example, it may be desirable for PC 120 to communicate with server 126 in order to acquire information from the data storage element 124. Accordingly, if the network connections coupling the PC 120 and the server 126 are slow, then these connections will limit communication between PC 120 and server 126. Performance of the communication between PC 120 and server 126 may be further limited or degraded in cases where the processing bandwidth for the PC 120 and server 126 are low. Furthermore, during operation, multiple PCs such as PCs 112, 116 may be attempting to communicate with the server 126 in order to acquire information from the data storage element 124, while the PC 120 is simultaneously communicating with the server 126. In this regard, as the number of communication entities attempting to acquire information from the data storage element 124 via the server 126 increases, the limited processing bandwidth and communication bandwidth of the PC 120 and the server 126 may result in further delays and increased latency. Although the bandwidth of the connections of the PCs and servers to the LAN may be increased by adding higher bandwidth connections, this can be a costly venture. Similarly, the processing bandwidth may also be increased by adding faster processors but the cost may be prohibitive.

FIG. 1b is a block diagram 130 of an improved conventional networking environment illustrating the arrangements of various communication and storage entities, which addresses some of the drawbacks of the networking environment of FIG. 1a. Referring to FIG. 1b, there is shown a wide area network (WAN) 110 comprising a plurality of local area networks (LANs) 102, 104, 106, 108 and a router 132. The LANs 102, 104, 106, 108 are coupled via the router 132. The LAN 102 comprises PCs 112, 116, 120, servers 126, 128 and data storage elements 132 and 134.

The data storage element 134 may comprise a plurality of storage devices such as a disk array, which may be coupled to the server 126. The data storage element 136 may also comprise a plurality of storage devices such as a disk array, which may be coupled to the server 128. The LANs 104, 106, 108 may also comprise a plurality of PCs, data storage elements and servers which may be configured in a somewhat similar manner as in LAN 102.

During operation, the PCs 112, 116, 120 may communicate with each other and with the servers 126, 128 via the LAN 102. The PCs 112, 116, 120 may also communicate with communication entities coupled to the LANs 104, 106, 108 via the router 132. Additionally, the communication entities coupled to the LANs 104, 106, 108 may also communicate with the PCs 112, 116, 120, servers 126, 128, and the data storage elements 134, 136.

When compared to the networking environment of FIG. 1a, the servers 126, 128 may be configured so that they have much greater communication and processing bandwidth that the PCs 112, 116, 120. Notwithstanding, although the networking environment configuration of FIG. 1b may provide better performance than the networking environment of FIG. 1a, one drawback with the configuration of FIG. 1b is that the servers 126, 128 are now bottlenecks. In this regard, as the number of connections to the servers requesting information from the data storage entities 134, 136 increases, the servers themselves will become bottlenecks resulting is degradation of system performance. For example, in instances when the PCs 112, 116, 120 and other networking communication entities coupled to the LANs 104, 106, 108 simultaneously acquire information from the servers 126 and/or 128, some connections may be blocked since the servers 126 may not have the capacity to handle all the connections.

FIG. 1c is a block diagram 140 of an improved conventional networking environment illustrating the arrangements of various communication and storage entities, which addresses some of the drawbacks of the networking environment of FIG. 1a and FIG. 1b. Referring to FIG. 1c, there is shown a wide area network (WAN) 110 comprising a plurality of local area networks (LANs) 102, 104, 106, 108, a router 132 and a storage area network (SAN) 142. The LANs 102, 104, 106, 108 are coupled via the router 132. The LAN 102 comprises PCs 112, 116, 120 and servers 126, 128. The storage area network 142 comprises data storage elements 144, 146 and 148.

The data storage elements 144, 146, 148 may comprise a plurality of storage devices such as disk arrays, which may be coupled to the servers 126, 128 via the storage access network 142. Each of the LANs 104, 106, 108 may also comprise a plurality of PCs and servers which may be configured in a somewhat similar manner as in LAN 102. One or more servers coupled to the LANs 104, 106, 108 may also be coupled to the storage area network 142 or may communicate with data storage elements 144, 146, 148 via the storage area network 148. Since any of the LANs 102, 104, 106, 108 may communicate directly or indirectly with the storage area network 142, information stored in the data storage elements 144, 146, 148 may be more readily accessible without encountering the bottlenecks previously associated with the networking environments of FIG. 1a and FIG. 1b.

FIG. 2 is a block diagram of an exemplary local area network (LAN) coupled to a storage area network (SAN). Referring to FIG. 2, there is shown LANs 202, 204, 206, 208 and storage access network (SAN) 240. The LAN 202 may comprise PCs 210, 212, 214, and servers 216, 218. The storage area network 240 may comprise a fibre channel (FC) switch 224, file servers (FSs) 226, 228, 230 and a plurality of data storage elements 232, 234, 236. Each of the data storage elements 232, 234, 236 may comprise a plurality of fibre channel hard disks.

The storage access network 240 may be coupled to the LAN 202 via host bus adapters (HBAs) 220, 222, which interfaces with the servers. In this regard, the host bus adapter 220 may be configured to interface with the fibre channel switch 224 and the server 216, and the host bus adapter 222 may be configured to interface with the fibre channel switch 224 and the server 218. The file server 226 may be coupled to the data storage element 232, the file server 228 may be coupled to the data storage element 234 and the file server 230 may be coupled to the data storage element 236.

The file servers 216, 218 may comprise a plurality of ports to which a data storage device such as a hard disk may be coupled. Each of the file server's plurality of ports may be electrically and/or optically coupled to a single storage element such as a hard disk. In this regard, each of the file servers 226, 228, 230 supports a single point-to-point connection with a particular hard disk.

The fibre channel switch 224 may be adapted to switch connections between servers and the file servers. For example, the fibre channel switch 224 may be adapted to switch connections from the server 216 to any of the file servers 226, 228, 230 in order to provide access to the data storage elements 232, 234, 236 respectively. Similarly, the fibre channel switch 224 may be adapted to switch connections from the server 216 to any of the file servers 226, 228, 230 in order to provide access to any one or more of the data storage elements 232, 234, 236 respectively.

In operation, PC 214 may utilize any of the servers 216, 218 to retrieve information from any of the file servers 232, 234, 236. In a case where PC 214 establishes a connection with server 216 in order to retrieve information from the file server 236, then the fibre channel switch 224 may switch the connection from the server 216 to the file server 236. In another example, a communication device coupled to LAN 204 may establish a connection with server 218 in order to retrieve information from the file server 234. The fibre channel switch 224 may switch the connection from the server 218 to the file server 234.

Although the networking environment of FIG. 2 provides significantly increased performance over the conventional networking environments illustrated in FIG. 1a, FIG. 1b and FIG. 1c, a major drawback with the networking environment of FIG. 2 is its point-to-point communication link existing between each of the hard disks and each of the plurality of file server ports. In particular, the point-to-point communication links existing between each of the hard disks and the file server ports can be quite expensive to operate and/or maintain.

Since data availability is the lifeline of every business, data loss is not only intolerable but its loss may interrupt daily operation and cause significant loss of revenue. In order to improve data availability, components with higher MTBF are required and systems are generally subjected to and are required pass a rigorous suite or battery of tests. In order to prevent data loss, storage systems which utilize, for example, fibre channel (FC) drives, are designed with a dual loop architecture which is adapted to facilitate data access through the second loop which may be utilized to provide redundancy.

FIG. 3 is a block diagram of a conventional fibre channel arbitrated loop arrangement which may be utilized for coupling a plurality of hard disks which may be found in the data storage entities of FIG. 1a, FIG. 1b, FIG. 1c and FIG. 2. Referring to FIG. 3, there is shown a server 302, a host bus adapter 304, and a plurality of hard disks, namely, 306a, 306b, 306c, 306d, 306e, 306f, 306g, 306h, 306i, 306j and 306k. Each of the hard disks 306a, . . . , 306k may comprise a port bypass controller and repeater (PBC/R) block. Each of the port bypass controller and repeater blocks may comprise a dual port architecture for redundancy.

The host bus adapter 304 interfaces with the server 302 and couples the hard disks to the server 302. The hard disks 306a, . . . , 306k are arranged in a loop or ring configuration with the first hard disk 306a in the ring coupled to the host bus adapter 304. The second hard disk 306b is coupled to the first hard disk 306b and the third hard disk 306c is coupled to the second hard disk 306b. The remaining hard disks are coupled or chained in a similar arrangement with the last hard disk 306k in the chain or loop being coupled to the host bus adapter 304. The last hard disk 306k is also chained to hard disk 306j. The fibre channel arbitrated loop (FC-AL) arrangement is a ring arrangement that is somewhat similar in arrangement to a token ring configuration, but only with regard to their configuration. With regard to its operation, the fibre channel arbitrated loop does not utilize a token for facilitating communication between nodes on the loop. Rather, the fibre channel arbitrated loop utilizes an arbitrated loop address to facilitate communication between the nodes that are coupled to the loop.

Each of the hard disks that are on the fibre channel arbitrated loop, which may also be referred to as a ring, share the bandwidth allocated for the loop. Communication over the loop occurs on a point-to-point basis between an initiating hard disk and a destination hard disk. At any particular instant during which communication occurs over the loop, only two (2) ports, may be active at the same time. The two ports that are active include the port that won loop arbitration and the port that is in communication that won the arbitration. The port that has won the arbitration may be referred to as the initiating port and the port in communication with the port that won the arbitration may be referred to as the destination port. Traffic does not have to be routed between the initiating port and destination port since there is point-to-point communication between the initiating port and the destination port. During communication, ports other than the initiating port and the destination port in the loop are adapted to receive frames and forward the received frames to successive ports in the loop. The received frames may be data frames and control frames such as acknowledgements and ready frames. A major drawback with this type of receive and forward scheme is the increased latency penalty introduced and incurred by each successive port in the loop.

Some fibre channel arbitrated loop implementations such as the implementation illustrated in FIG. 3 were based on analog port bypass controller (PBC) and repeaters (R). The combination of loop architecture with the port bypass controller were prone to problems which often resulted in catastrophic loop failures since one hard disk could potentially affect the operation of all the other hard disks in the loop. These port bypass controller implementations required operators or service technicians to insert and/or remove each hard disk individually in order to determine and/or isolate the actual location of a loop failure or failed hard disk. Furthermore, an overwhelming majority of these failures were signal integrity related.

The ports in these conventional port bypass controllers also suffer from relatively high latencies. Furthermore, expensive test equipment and/or networking software have to be deployed in order to diagnose problems that may be occurring at the hardware level. Accordingly, maintaining networking equipment containing these port bypass controllers may be quite an expensive task.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for handling data in port bypass controllers. Aspects of the method may comprise receiving a data stream from a receive port of a port bypass controller and buffering at least a portion of the received data stream in at least one EFIFO buffer integrated within the port bypass controller. A data rate or frequency of the received data stream may be changed by utilizing at least one extended fill word. In this regard, the data rate or frequency of the received data stream may be changed by inserting at least one extended fill word in the portion of the received data stream which is buffered in the EFIFO buffer or by deleting at least one fill word from the received data stream buffered in the EFIFO buffer. The extended fill word may comprise a loop initialization primitive (LIP), a loop port bypass (LPB), a loop port enable (LPE), a not operation state (NOS), an offline state (OLS), a link reset response (LRR) and/or a link reset (LR).

At least a portion of the received data may be buffered in one or more levels in the EFIFO buffer. The levels in the EFIFO buffer may comprise an insertion pending level which may be referred to as level 1 (L1), a quiescent level which may be referred to as level 2 (L2), a low priority deletion pending level which may be referred to as level 3 (L3) and a high priority deletion pending level which may be referred to as level 4 (L4). The insertion pending level (L1) implements a buffer space of at least one-half (½) of a fill word in the EFIFO buffer. The quiescent level (L2) and/or the low priority deletion pending level (L3) may be adapted to implement a buffer space of at least one fill word in the EFIFO buffer.

If data from the received data stream is only in level 1 (L1) of the EFIFO buffer, a current extended fill word may be inserted immediately after any of the extended fill word. In this regard, the current extended fill word may be a standard fill word and/or an extended fill word. If data from the received data stream is in the low priority deletion pending level (L3) in the EFIFO buffer, then if after about four (4) extended fill words there is no intervening non-ordered set, a next extended fill word may be deleted. If data from the received data stream is in the low priority deletion pending level (L3) in the EFIFO buffer, then if a current fill word changes to idle while there is at least one delete pending, a first of the idle may be deleted.

In another aspect of the invention, after executing a low priority delete, the low priority deletion pending level (L3) of the EFIFO buffer may be entered and a waiting period of four (4) extended fill words may elapse before executing another deletion. Furthermore, after executing a low priority delete, the quiescent level (L2) of the EFIFO buffer may be entered whenever there is no deletion pending.

If data from the received data stream reaches the high priority deletion pending level (L4), then if after about two (2) extended fill words there is no intervening non-ordered set, a next extended fill word may be deleted. Furthermore, if data from the received data stream reaches the high priority deletion pending level (L4), then if a current fill word changes to idle while at least one delete is pending, a first of the idle may be skipped without deleting the first idle.

After executing a high priority word delete, the low priority deletion pending level (L3) may be entered after waiting for about four (4) extended fill words before executing another delete. Furthermore, after executing a high priority word delete, the high priority deletion pending level (L4) may be re-entered after waiting for about two (2) extended fill words before executing another delete. In this case, the delete may be executed if there is sufficient space available in the EFIFO buffer.

The method may further comprise multiplexing an output steam from each of the levels in the EFIFO buffer. If an collision occurs in the EFIFO buffer, one or more interrupts may be generated. An inter-frame gap existing between two consecutive frames in the received data stream may be determined or located. At least one extended fill word may be inserted in a portion of the inter-frame gap in the EFIFO buffer and/or at least one fill word from the inter-frame gap may be deleted in the EFIFO buffer.

Another embodiment of the invention may provide a machine-readable storage, having stored thereon, a computer program having at least one code section executable by a machine, thereby causing the machine to perform the steps as described above for handling data in port bypass controllers.

Aspects of the system for handling data in port bypass controllers may comprise at least one EFIFO buffer that receives a data stream from a receive port of a port bypass controller. At least one processor may buffer at least a portion of the received data stream in the at least one EFIFO buffer integrated within the port bypass controller. The processor may be an integrated port bypass controller processor or a host processor. The processor may be adapted to change a data rate or frequency of the received data stream by utilizing at least one extended fill word. In this regard, the processor may insert at least one extended fill word in the buffered portion of the received data stream and/or delete at least one fill word from the received data stream buffered in the EFIFO buffer. The extended fill word may comprise a loop initialization primitive (LIP), a loop port bypass (LPB), a loop port enable (LPE), a not operation state (NOS), an offline state (OLS), a link reset response (LRR) and/or a link reset (LR).

The processor may buffer a portion of the received data in one or more levels in the EFIFO buffer. Exemplary levels in the EFIFO buffer may comprise an insertion pending level referred to as level 1 (L1), a quiescent level referred to as level 2 (L2), a low priority deletion pending level referred to as level 3 (L3) and a high priority deletion pending level referred to as level 4 (L4). The insertion pending level (L1) may be adapted to implement a buffer space of at least one-half (L2) of a fill word in the EFIFO buffer. The quiescent level (L2) and the low priority deletion pending level (L3) may be adapted to implement a buffer space in the EFIFO buffer of at least one fill word. The processor may be configured to insert a current extended fill word immediately after any extended fill word, if data from the received data stream is only in level 1 (L1) of the EFIFO buffer. In this regard, the current extended fill word may be a standard fill word and/or the at least one extended fill word.

If data from the received data stream is in the low priority deletion pending level (L3) in the EFIFO buffer and if after about four (4) extended fill words there is no intervening non-ordered set, the processor may delete a next extended fill word. If data from the received data stream is in the low priority deletion pending level (L3) in the EFIFO buffer and if a current fill word changes to idle while there is at least one delete pending, the processor may delete a first of the idle.

For a low priority delete, the processor may access the low priority deletion pending level (L3) of the EFIFO buffer and wait for about four (4) extended fill words before executing another deletion. Similarly, for a low priority delete, the processor may access the quiescent level (L2) of the EFIFO buffer whenever there is no deletion pending.

The processor may also be adapted to delete a next extended fill word, if data from the received data stream reaches the high priority deletion pending level (L4) and if after about two (2) extended fill words, there is no intervening non-ordered set. A first idle may be skipped if data from the received data stream reaches the high priority deletion pending level (L4) and if a current fill word changes to idle while at least one delete is pending. In other words, in this case, the first idle is not deleted. However, idles subsequent to the first idle may be deleted.

After executing a high priority word delete, the processor may enters the low priority deletion pending level (L3) and wait for about four (4) extended fill words before executing another delete. Also, after executing a high priority word delete, the processor may re-enter the high priority deletion pending level (L4) and wait for about two (2) extended fill words before executing another delete if available space is located is the EFIFO buffer.

The processor may be adapted to multiplex an output steam from each of the levels in the EFIFO buffer. The processor may generate at least one interrupt if a collision occurs in the EFIFO buffer. The processor may further be adapted to determine an inter-frame gap between two consecutive frames in the received data stream. The processor may insert one or more extended fill words in a portion of the inter-frame gap in the EFIFO buffer and/or delete at least one fill word from the inter-frame gap in the EFIFO buffer.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 1b is a block diagram of an improved conventional networking environment illustrating the arrangements of various communication and storage entities, which addresses some of the drawbacks of the networking environment of FIG. 1a.

DETAILED DESCRIPTION OF THE INVENTION

Figure 1A:
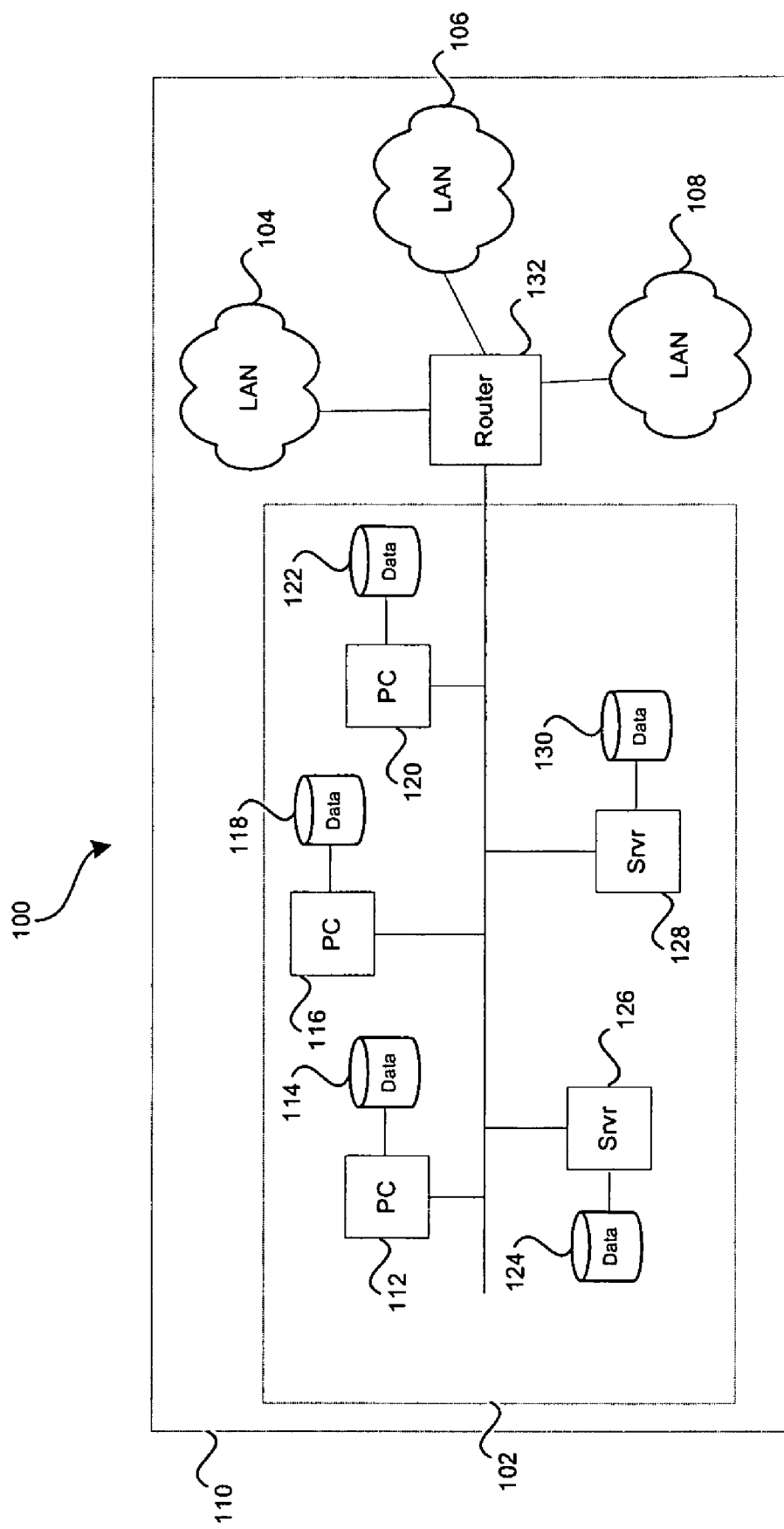
FIG. 1a is a block diagram of a conventional networking environment illustrating the arrangements of various communication and storage entities.
Figure 1B:
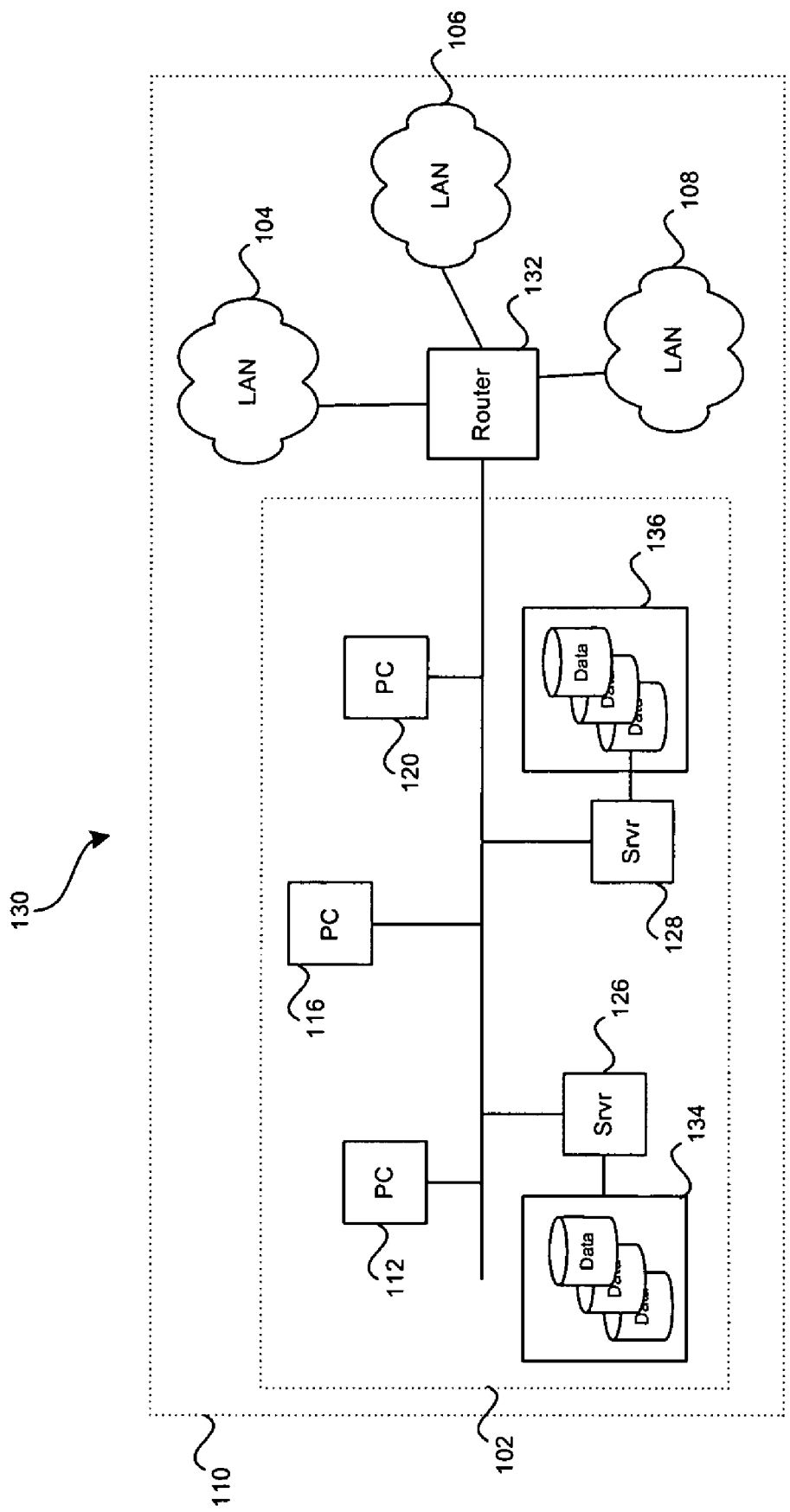
Figure 1C:
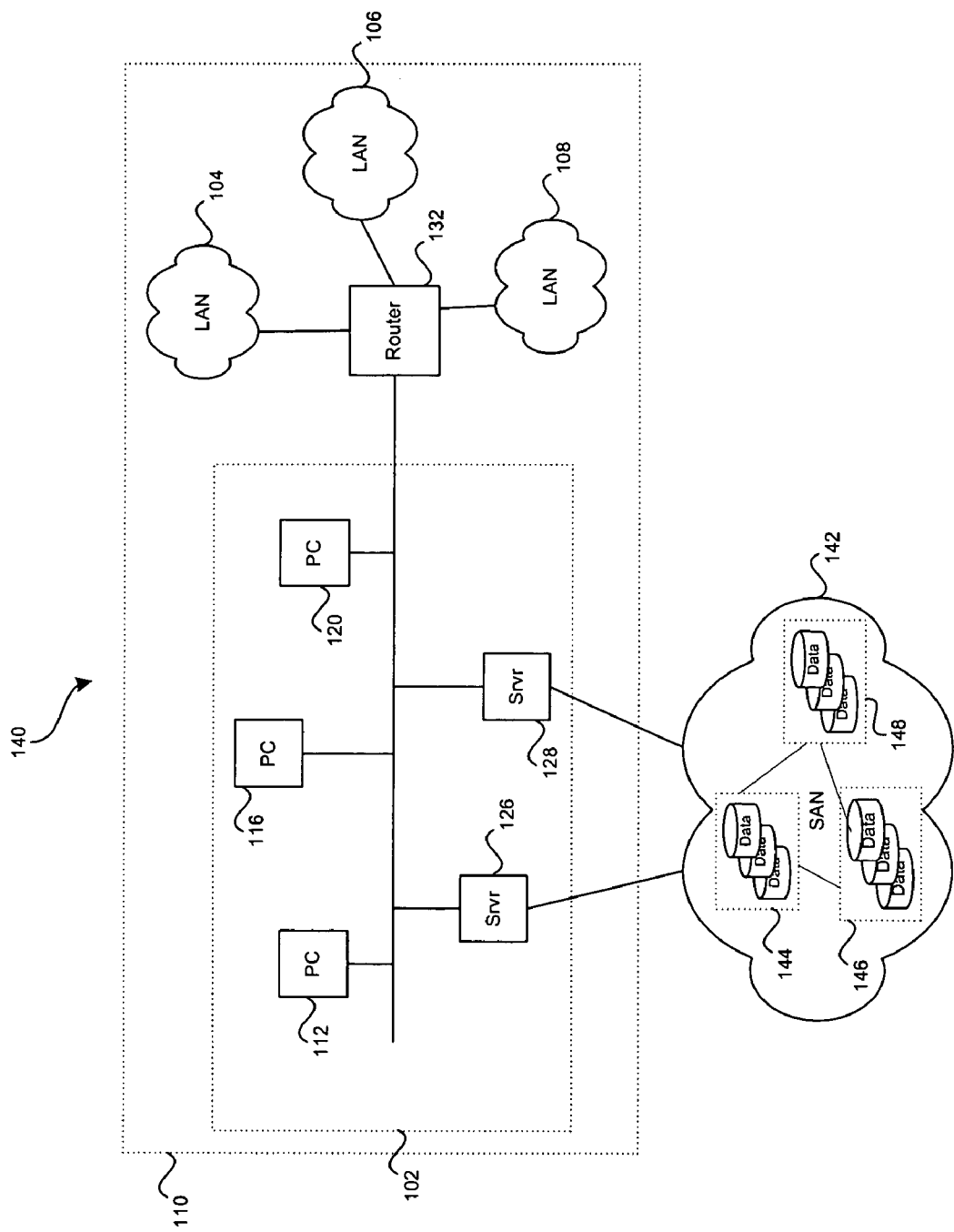
FIG. 1c is a block diagram of an improved conventional networking environment illustrating the arrangements of various communication and storage entities, which addresses some of the drawbacks of the networking environment of FIG. 1a and FIG. 1b.
Figure 2:
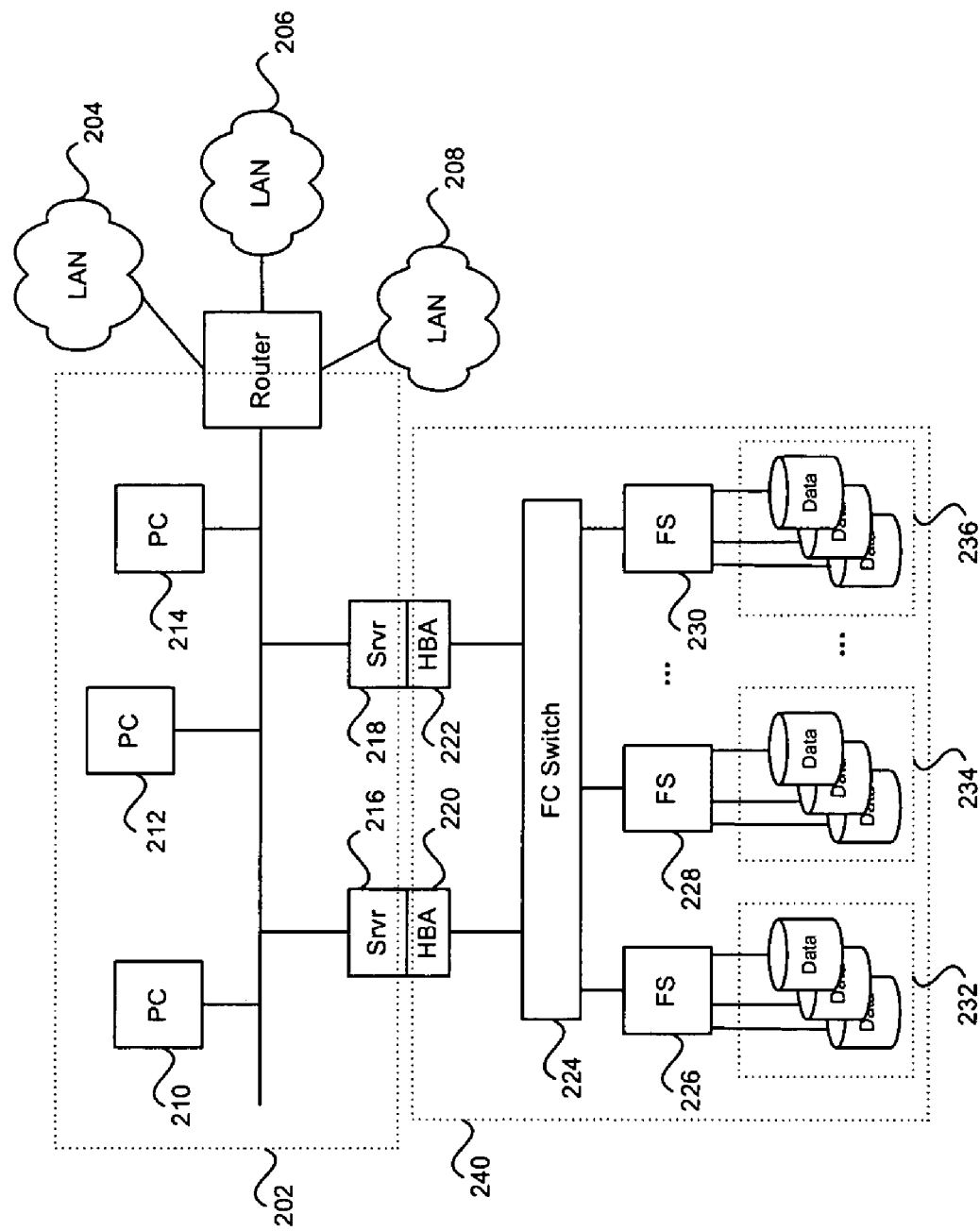
FIG. 2 is a block diagram of an exemplary local area network (LAN) coupled to a storage area network (SAN).
Figure 3:
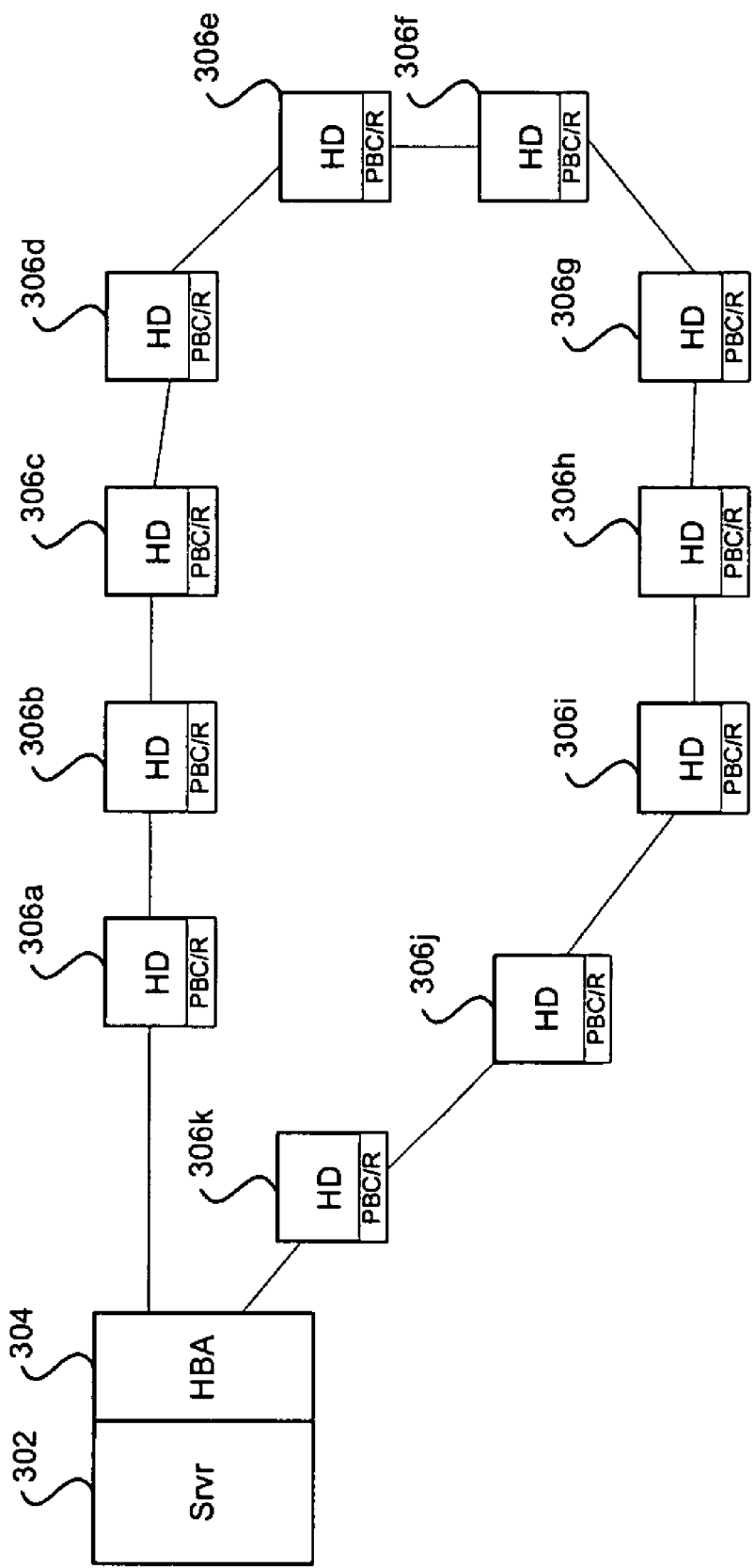
FIG. 3 is a block diagram of a conventional fibre channel arbitrated loop arrangement which may be utilized for coupling a plurality of hard disks which may be found in the data storage entities of FIG. 1a, FIG. 1b, FIG. 1c and FIG. 2.

Certain embodiments of the invention may be found in a method and system for handling data in port bypass controllers. Aspects of the method may comprise receiving a data stream from a receive port of a port bypass controller and buffering at least a portion of the received data stream in at least one EFIFO buffer integrated within the port bypass controller. A data rate or frequency of the received data stream may be changed by inserting at least one extended fill word in the portion of the received data stream which is buffered in the EFIFO buffer. The data rate or frequency of the received data stream may also be changed by deleting at least one fill word from the received data stream buffered in the EFIFO buffer. The extended fill word may comprise a loop initialization primitive (LIP), a loop port bypass (LPB), a loop port enable (LPE), a not operation state (NOS), an offline state (OLS), a link reset response (LRR) and/or a link reset (LR).

The introduction of active signal integrity (Active-SI™) and active line integrity (Active-LI™) technology by Broadcom Corporation of Irvine, Calif., has provided various improvements with regards to reliability, availability, and serviceability (RAS) of network connections. Active signal integrity (Active-SI™) and active line integrity (Active-LI™) technology incorporates, for example, the equivalent of a bit error rate (BER) tester (BERT), an oscilloscope, and a protocol analyzer into some or all of the ports of an integrated communication device. Active-SI/LI improves system reliability, availability, and serviceability (RAS) from the chip level and may aid in, for example, system development, system integration and testing, and system deployment and startup. Accordingly, active-SI/LI provides improved time to market (TTM) and may also aid in identifying and isolating faulty system components or entities in the field. All of this translates to reduced ownership cost and significantly lower maintenance costs.

With regard to, for example, storage systems or arrays, active signal integrity (Active-SI™) and active line integrity (Active-LI™) technology may be incorporated in each fibre channel (FC) port creating a new class of intelligent port bypass controllers (PBCS) which may be referred to as intelligent bunch of disks (IBODs). IBOD devices comprise the intelligence of switches but are nonetheless, transparent to data traffic. Accordingly, this may eliminate any possible protocol interoperability problems that may arise. Each IBOD port may operate as full retiming with nominal latency of, for example, 2 to 4 fibre channel (FC) words or in repeating mode with a latency of, for example, less than one (<1) FC word. Since, IBOD devices are transparent to data traffic, any conventional or other backplane may be converted with minimal redesign effort in order to utilize active signal integrity (Active-SI™) technology and active line integrity (Active-LI™) technology for improved reliability, availability and serviceability (RAS).

Although Active-SI and Active-LI technologies may be incorporated in the exemplary port bypass controllers disclosed herein, the invention is not so limited. Accordingly, aspects of the method and system for handling data in port bypass controllers may be practiced without utilizing Active-SI and Active LI technologies.

Figure 4A:
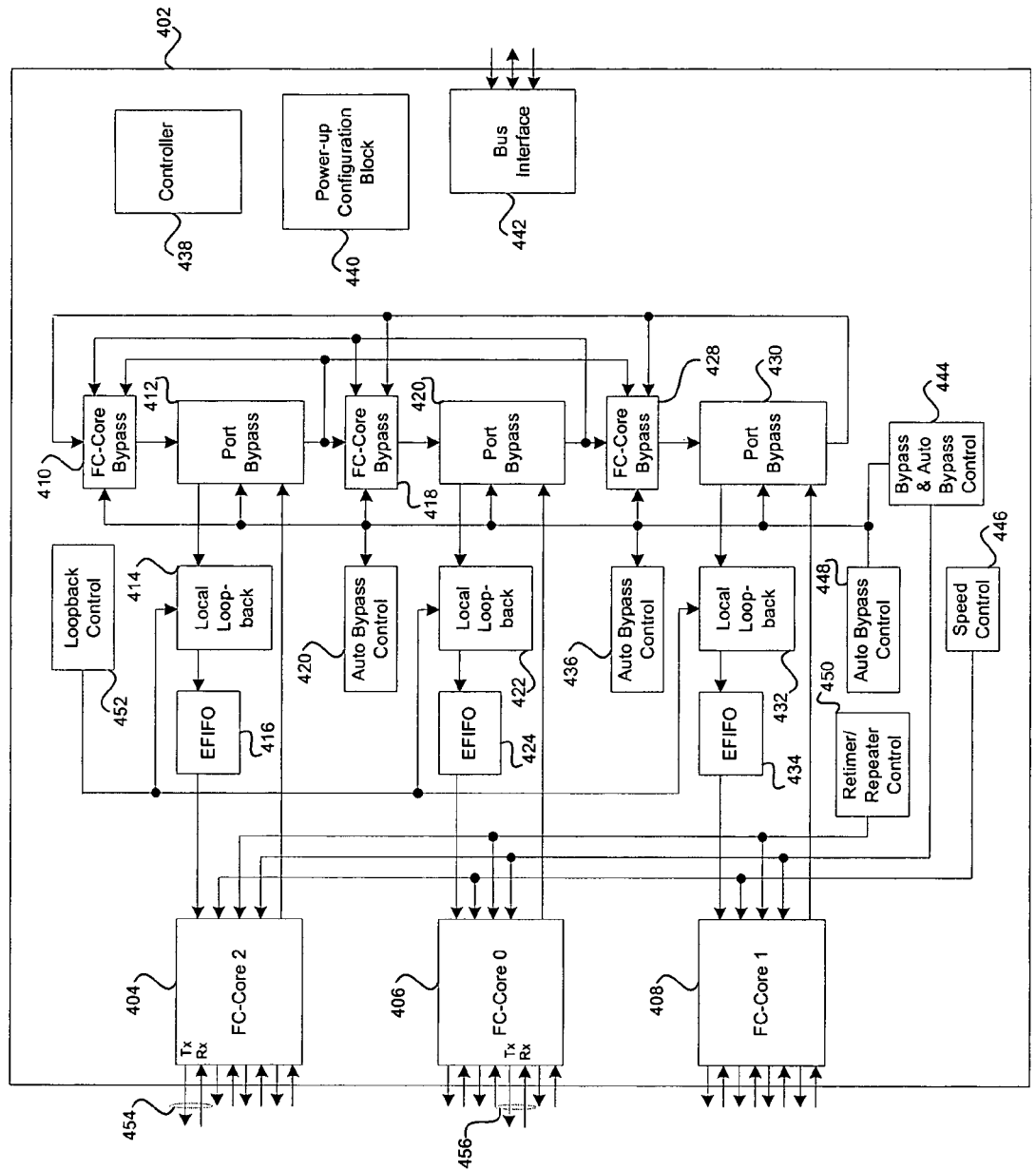
FIG. 4a is a block diagram illustrating an exemplary IBOD device that may be utilized in connection with seamless double switching and a robust EFIFO in a port bypass controller, in accordance with and embodiment of the invention.

FIG. 4a is a block diagram illustrating an exemplary IBOD device that may be utilized in connection with seamless double switching and a robust EFIFO in a port bypass controller. Referring to FIG. 4a, the exemplary IBOD device 400 may comprise a plurality of FC-Cores including FC-Core 0

(406), FC-Core 1 (408), and FC-Core 2 (404), a controller or CPU block 438, a power-up configuration block 440 and a bus interface block 442.

Each of the FC-Cores 404, 406, 408 has an associated control block which comprises a FC-Core bypass block, a port bypass block, a local loopback block and an EFIFO block. In this regard, the control block for FC-Core 2 (404) comprises FC-Core bypass block 410, port bypass block 412, local loopback block 414 and EFIFO 416. The control block for FC-Core 0 (406) comprises FC-Core bypass block 418, port bypass block 420, local loopback block 422 and EFIFO 424. The control block for FC-Core 1 (408) comprises FC-Core bypass block 428, port bypass block 430, local loopback block 432 and EFIFO 434.

The IBOD device 402 may also comprise a bypass and automatic bypass control block 444, speed control block 446, auto bypass control block 448, retimer/repeater control block 450 and loopback control block 452. The bypass and automatic bypass control block 444, speed control block 446 and retimer/repeater control block 450 may be coupled to each of the FC-Cores 404, 406, 408. The bypass and automatic bypass control block 444 and automatic bypass control block 448 may be coupled to each of the port bypass block 412, 420 and 430. The loopback control block 452 may be coupled to each of the local loopback blocks 414, 422, 432 for each of the FC-Cores 404, 406, 408 respectively.

Each of the FC-Core bypass blocks 410, 718, 428 associated with FC-Cores 404, 406, 408 may comprise a multiplexer or other suitable selector that may be adapted to bypass a corresponding FC-Core when the multiplexer or selector is enabled. For example, FC-Core bypass block 410 may be utilized to bypass FC-core 404 when the FC-Core bypass block 410 is enabled. Similarly, the FC-Core bypass block 418 may be utilized to bypass FC-core 406 when the FC-Core bypass block 418 is enabled. Finally, FC-Core bypass block 428 may be utilized to bypass FC-core 408 when the FC-Core bypass block 428 is enabled. When a FC-Core is bypassed, all the ports for that FC-Core are bypassed.

Each of the port bypass blocks 412, 420, 430 associated with FC-Cores 404, 406, 408 respectively may comprise suitable logic, circuitry and/or code that may be adapted to effectuate port bypass.

Each of the local loopback blocks 414, 422, 432 associated with FC-Cores 404, 406, 408 respectively may comprise suitable logic, circuitry and/or code that may be adapted to place a corresponding port of the FC-Core in a local loopback. In this regard, a particular local loopback block may internally configure a particular port of a FC-Core so the transmit (Tx) and receive (Rx) lines for that particular port are cross connected. For example, local loopback block 414 may internally configure port 454 of FC-Core 404 so that its transmit (Tx) and receive (Rx) lines are cross connected. The loopback control block 452 may comprise suitable logic, circuitry and/or code that may be adapted to control each of the local loopback blocks 414, 422, 432 for each of the FC-Cores 404, 406, 408 respectively. For example, loopback control block 452 may configure port 456 associated with FC-Core 406 in a local loopback mode. In local loopback mode, the transmit (Tx) lines and receive (Rx) lines for a particular port may be cross connected from within the corresponding FC-Core.

Each of the elastic FIFO (EFIFO) blocks 416, 424, 434 associated with FC-Cores 404, 406, 408 respectively may comprise suitable logic and/or circuitry that may be adapted to introduce and/or change a data rate and/or phase of received and/or transmitted data handled by the FC-Cores 404, 406, 406.

The bypass and automatic bypass control block 444 and the automatic bypass block 448 may comprise suitable logic, circuitry and/or code that may be adapted to control bypass of at least one of the ports for a particular FC-Core. Accordingly, the bypass and automatic bypass control block 444 and/or the automatic bypass block 448 in conjunction with a corresponding port bypass block may be utilized to bypass one or more of the ports for a particular FC-Core. For example, port bypass and automatic bypass control block 444 and/or the automatic bypass block 448 in conjunction with port bypass block 420 may be configured to enable or disable at least one port such as port 456 of FC-Core 406.

The speed control block 446 may comprise suitable logic, circuitry and/or code that may be adapted to control and adapt the operation of the FC-Cores 404, 406, 408 to a plurality of different data rates. Additionally, the speed control block may be further adapted for automatic speed negotiation.

The repeater/retimer block 450 may comprise suitable logic, circuitry and/or code that may be adapted to control retiming and repeating of signals for each of the ports for the FC-Cores integrated within the IBOD device 402.

The power-up configuration block 440 may comprise suitable logic, circuitry and/or code that may be utilized to initialize the IBOD device 402. Suitable logic may include, but is not limited to, registers and/or memory that may be adapted to store initialization parameters and/or values. For example, the power-up configuration block 440 may comprise a plurality of control registers.

The controller or CPU block 438 may comprise suitable logic, circuitry and/or code that may be utilized to configure and control the operations of the IBOD device 402. Suitable logic may comprise one or more registers and/or memory that may be adapted to configure various operations for the IBOD device 402. The control block 438 may further comprise a plurality of status registers that may be read in order to determine an operational state of the IBOD device. The controller or CPU block 438 may also be communicatively coupled to a host processor via the bus interface block 442. The controller or CPU block 438 is integrated within the port bypass controller and may also be referred to as an integrated port bypass controller processor.

The bus interface block 442 may be, for example, a serial or parallel interface bus that may be adapted to provide communication between the IBOD 402 and a host processor or CPU, for example. In one exemplary embodiment of the invention, the bus interface block 442 may be a standardized I$^2$C bus.

Figure 4B:
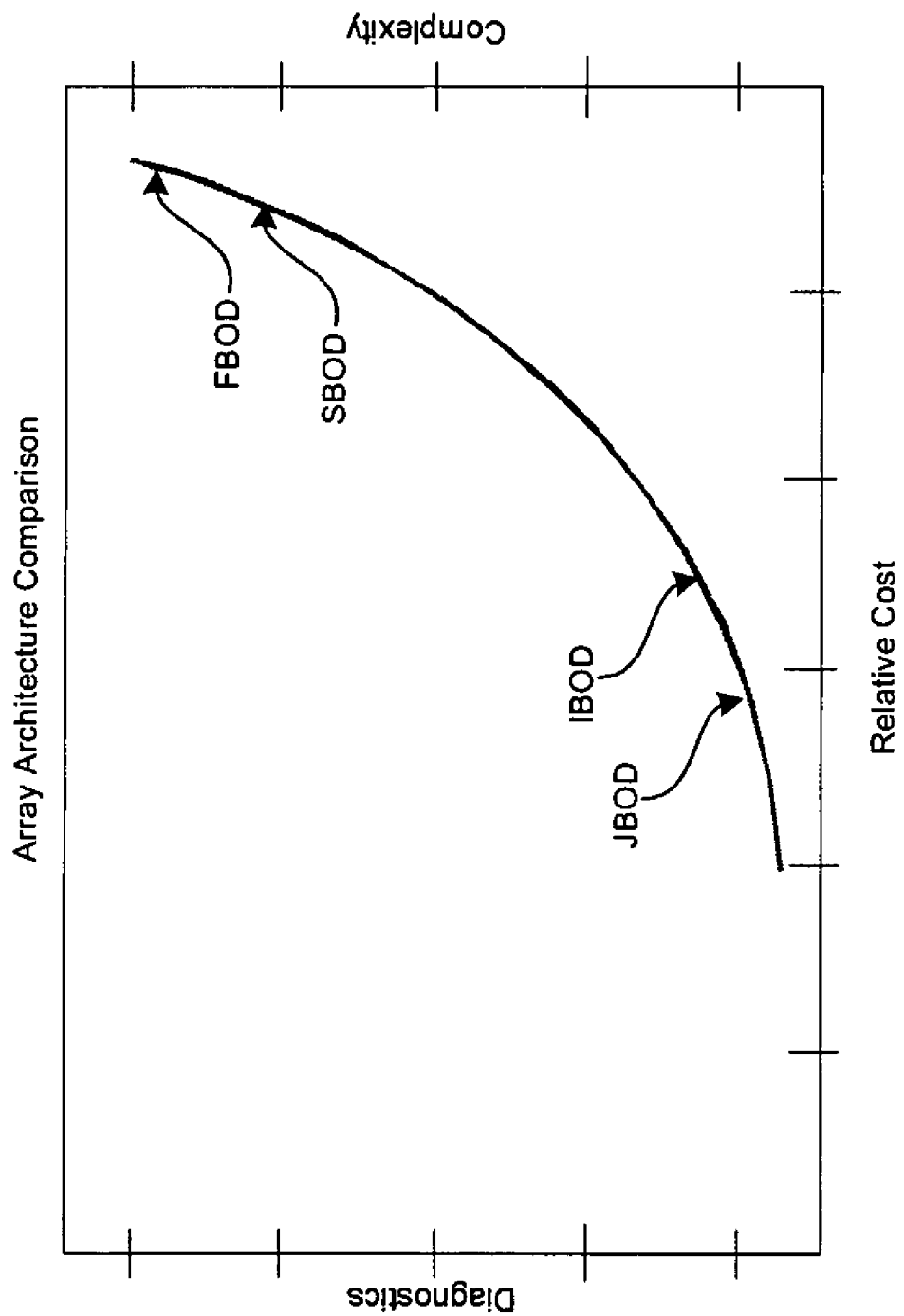
FIG. 4b is a graph illustrating a comparison of just bunch of disk (JBOD), intelligent bunch of disk (IBOD™), switched bunch of disk (SBOD), and fabric bunch of disk (FBOD™) that may be utilized in connection with seamless double switching and a robust EFIFO in a port bypass controller, in accordance with an embodiment of the invention.

FIG. 4b is a graph illustrating a comparison of just bunch of disk (JBOD), intelligent bunch of disk (IBOD™), switched bunch of disk (SBOD), and fabric bunch of disk (FBOD™) technologies that may be utilized in connection with seamless double switching and a robust EFIFO in a port bypass controller, in accordance with an embodiment of the invention. Referring to FIG. 4, the left vertical axis refers to diagnostics capability, the right vertical axis refers to complexity and the horizontal axis refers to relative costs. At the lower end of the curve is JBOD, next higher is IBOD, next higher is SBOD and the highest end is FBOD. One technology driving and enabling IBODs is advanced serializer/deserializer (SerDes or SERDES) technology which incorporates Active-SI and Active-LI. Although FBOD and SBOD have the highest relative cost and greatest complexity, hybrid implementations of IBOD and FBOD may be provided which offer improved scaling and performance with cost on par with SBOD.

Active-SI/LI SERDES is adapted to transparently monitor incoming signal quality, such as FC0, FC1, and some FC2 functions at the chip level, without disturbing the signal. The SERDES may be incorporated into port bypass controllers and switches.

Due to the fact that a majority of storage array failures have traditionally been related to signal integrity, monitoring signal integrity and quality (SI) may be the most direct method for diagnosing the root cause of these failures. Although some signal integrity (SI) problems may eventually be elevated to the transport layer and be detected by FC1 or FC2 layer by utilizing conventional managed PBC or a loop switch (LS), some signal integrity problems go undetected at the transport layer or may never be elevated to the transport layer. Active-SI/LI SERDES may be utilized to further monitor signal quality degradation which may not be visible to a loop switch until a catastrophic failure occurs.

With regard to Active-SI/LI performance monitoring (PB), Active-SI may monitor the incoming signal quality and integrity and Active-LI may further enhance active-SI by monitoring the transport layer and providing estimates of the bit error rate of the link. Active-SI/LI SERDES may be integrated on-chip to create IBOD and FBOD arrays, which may provide various key features and benefits such as variable signal detection. Variable signal detection may permit a plurality of programmable levels to be defined, which may be utilized for determining input signal amplitude. In this regard, variable signal detection may allow programming of, for example, eight (8) possible discrimination levels which may be utilized to determine an amplitude of an input signal. An eye margin may be calculated for some or all of the input ports and an associated bit error rate may be calculated for each port based on a bit by bit comparison. To determine system margin, the input port may be programmed with an offset to emulate, for example, suboptimal or degraded channel conditions. Whenever the threshold is reached, one or more alarms may be generated in order to report the alarm. Eye margin is a powerful tool that may be utilized to isolate conditions including, but not limited to, signal integrity issues such as excess reflection, excess noise coupling, connector issues, capacitor cracking, excess loss, and excess upstream jitter. Accordingly, by varying the threshold or discrimination level, any one or more of these conditions may be detected on a particular port.

Traffic monitoring may also be done on a port by port basis. In this regard, the traffic on each port as a percentage of the frame may be monitored to help show a status and health of the IBOD paths to the hard drives and a host system. Traffic flow may also be monitored for ordered set, idle, and the transmitted frames.

For bit error rate monitoring, active-LI may provide, for example, a bit by bit comparison which may be utilized to determine an actual serial error rate, as opposed to cyclic redundancy check (CRC) which only indicates a frame in error. In the latter case, the frame in error may comprise a single error or multiple errors which is not distinguished by the CRC. However, in accordance with an embodiment of the invention, the link may be monitored during start up and during operation for idle, LIP, and other ordered set so as to determine a bit error rate. If bit error rate monitoring is combined with the accelerated eye margin test from active signal integrity, then it may be possible to may drive in about 100's µs in the link bit error rate and eye opening. In addition to bit error rate monitoring on the ordered set, frames with a repeated word data payload may be monitored and counted for errors.

For frame bit error rate monitoring, active line integrity may also provide a bit by bit comparison which may be utilized to determine an actual serial error rate, as opposed to a cyclic redundancy check which only indicates a frame in error which may include one or multiple errors. During link start up, idle and LIP word transmission may be monitored to establish a bit error rate on the link. When bit error rate monitoring is combined with the accelerated eye margin test from active signal integrity, then one may drive about 100's µs in the link BER and eye opening.

Active LI will use 33 error-accumulation counter registers for initialization monitoring mode. Using an analog phase interpolator, the eye pattern may comprise 16 camping points to the right and 16 camping points to the left from the center of the eye. Other numbers of camping points may also be utilized.

With regard to the initialization monitoring mode, the active line integrity the initialization monitoring mode may bypass the 8B/10B decoder functionality. It will search for the 40-bit pattern and lock on it and accordingly, record the number of errors found in these patterns for the total length of the camping period for each eye-closure slice. In normal monitoring mode, for each port, active signal integrity will camp in a different slice of the eye pattern using the phase interpolator and during this period, the active signal integrity may analyze the signal stream for errors. The error-accumulator counter register associated with each slice may be updated during this period.

There may be two general activity levels in the fibre channel, which may include a data transfer level and an idle/control level. Camping in a slice of the eye pattern phase shift may occur for short periods. Accordingly, the activity in the fibre channel may be characterized by either mostly data transfer or mostly idle/control transfer. In the data transfer activity level mode, the most accurate information may be provided by the CRC counter for low BERs. When the error increases significantly, the CRC may fail to provide a reasonable approximation and the ordered set violation detection may start to pick up errors. The ordered set violation detection may not be very reliable until the BER is relatively high. Therefore, there may be a gap that must be compensated for by using the error accumulation information obtained during idle/ctrl activity level periods.

In the idle/control transfer activity level mode, the most accurate information may be provided by the detection counter. When the error increases significantly the ordered set violation will continue to provide a reasonable approximation. In normal operation, the error-accumulation errors may be read for all slices, but the type of activity level of the line may remain unknown during the monitoring period. Accordingly, various samples may be utilized, and an algorithm may be utilized to approximate the BER errors for the different phase-change slices. Active LI may utilize a plurality of main error counters including, for example, 8B/10B code violation counter, CRC error counter, and ordered set violation error-accumulator counter registers.

In the normal monitoring mode, active line integrity may be adapted to utilize the 8B/10B decoder and count the number of 8B/10B code violations for every slice. The number of errors found in the CRC for each frame and the number of ordered set violations for the whole camping period may be recorded. If the number of error exceeds a threshold for a particular slice, the active SI may generate an alarm which may indicate the associated slice number such as −16, −15, . . . , 0 , . . . , 15, 16. This may be a part of a ranging process.

With regard to active line integrity metrics, there may be a plurality of error-accumulator counter registers which may be associated with each phase slice. Exemplary error-accumulator counter registers may comprise 8B/10B running disparity error, CRC and ordered set violation registers. Error calculation may be based on the assumption that the errors are random and follow, for example, a Poisson distribution. An 8B/10B running disparity error counter may be accumulated in an error-accumulator counter register. The 8B/10B running disparity error counter value may be utilized as a possible metric to estimate the bit error rate. However, the 8B/10B running disparity error counter may be used as a warning mechanism rather than an estimation engine. With regards to a CRC error counter, a phase-camping slice may be camping during a data-transfer time, an idle/ctrl transfer time and a mixture-transition time. A CRC error counter may be utilized when frames are being transmitted.

Figure 5:
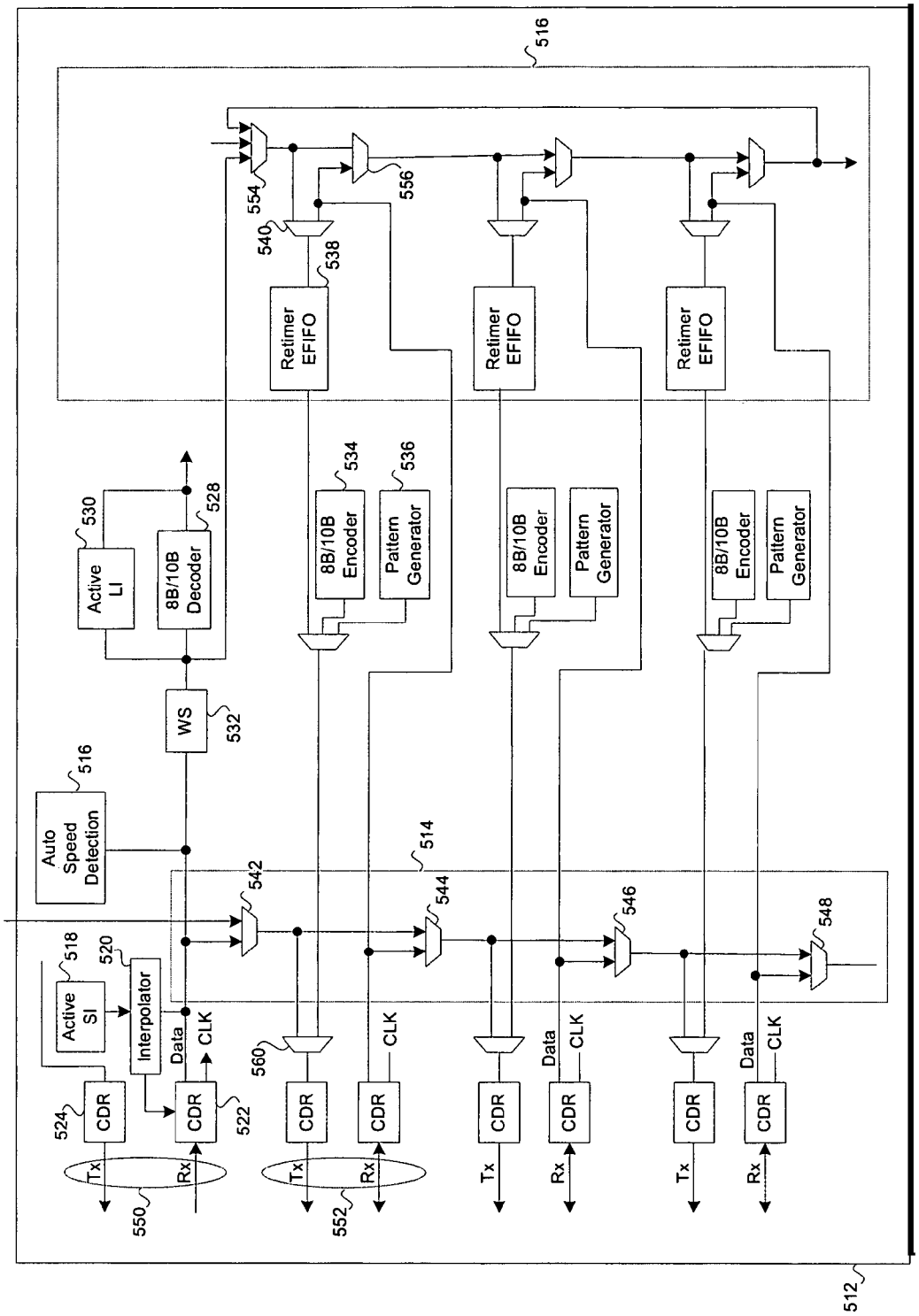
FIG. 5 is a block diagram illustrating an exemplary FC-Core repeater/retimer port switch that may be utilized in connection with the IBOD device of FIG. 4a, for example, for seamless double switching and a robust EFIFO in a port bypass controller, in accordance with an embodiment of the invention.

FIG. 5 is a block diagram illustrating an exemplary FC-Core repeater/retimer port switch that may be utilized in connection with the IBOD device of FIG. 4*a* for seamless double switching and a robust EFIFO in a port bypass controller, in accordance with an embodiment of the invention. Referring to FIG. 5, the FC-Core repeater/retimer port switch may comprise a FC-Core block 512 and a retimer switch block 516. The FC-Core block 512 may comprise an active signal integrity block 518, interpolator 520, auto speed detection block 526, word synchronization (WS) block 532, active line integrity block 530, 8B/10B decoder block 528, 8B/10B encoder block 534, and pattern generator 536.

FIG. 5 further comprises a repeater function block 514 and a retimer function block 516. The repeater function block 514 may comprise suitable logic and/or circuitry that may be utilized to implement the repeater function for each FC-Core such as FC-Core 512. The repeater function and block 516 illustrates exemplary logic that may be utilized for retiming function.

The FC-Core repeater/retimer port switch may also comprise a plurality of clock and data recovery (CDR) circuit blocks such as CDRs 524 and 522. The CDRs may be arranged in pairs in which a first CDR of a pair is configured to handle a receive (Rx) side and a second CDR of the pair is configured to handle a transmit (Rx) side for a particular port. For example, CDR 522 is configured as a receive CDR and CDR 524 is configured as a transmit CDR. The combination of a receive CDR and a transmit CDR pair may be referred to as a port. The FC-Core as illustrated comprises four (4) ports. However, the invention is not limited in this regard and each FC-Core may comprise more than or less than four (4) ports. Each port may be adapted to handle a single FC hard disk. A plurality of FC-ports may be coupled together and integrated into a single chip or integrated circuit. For example, three (3) FC-Cores each having four ports may be coupled together and integrated into a single chip which can handle 12 ports. In this regard, theoretically, a maximum of 12 hard disks may be handled by the twelve (12) ports. Although the interpolator block 520 is illustrated separately from the CDR block 522, the interpolator 520 may be part of the CDR 522. From a functional point of view, as illustrated, the CDR 522 may be viewed as an analog portion and the interpolator 520 may be viewed as a digital portion of a CDR.

The signal integrity block 518 may be adapted to initiate and manage signal integrity testing. Likewise, the active line integrity block 530 may be adapted to manage line integrity testing. U.S. application Ser. No. 10/779,001 discloses the functions and operation of active signal integrity and active line integrity and is hereby incorporated herein by reference in its entirety.

The interpolator 520 may be a hardware driven and/or software driven interpolator that may be adapted to track the phase of incoming or received data for active signal integrity operation. The auto speed detection block 526 comprises suitable logic, circuitry and/or code that may be adapted to automatically control speed negotiation at the physical coding sublayer (PCS) on the receiver side. In an embodiment of the invention, the auto speed detection block 526 may comprise a firmware algorithm the may reside on-chip within the IBOD device. The word synchronization (WS) block 532 may be adapted to provide synchronization at the physical coding sublayer (PCS) on the receiver side. In this regard, the word synchronization (WS) block 532 may be adapted to provide, for example, word boundary alignment.

The 8B/10B decoder block 528 may be a standardized 8B/10B compliant decoder that may be utilized to decode 10 bits of data into 8 bits of data. The 8B/10B encoder block 534 is a standardized 8B/10B compliant encoder that may be utilized to encode 8 bits of data into 10 bits of data. The pattern generator 536 may be adapted to generate control words or bit patterns or sequences that may be utilized, for example, for bit error rate testing. In this regard, one or more ports may be placed in loopback and tested by sending, for example, control words, ordered sets and/or bit patterns from the pattern generator 536. The auto speed detection block 526 may be adapted to detect the data speed and setup the appropriate clock signals, for example, the transmit and receive clocks, to provide the correct timing.

Figure 6:
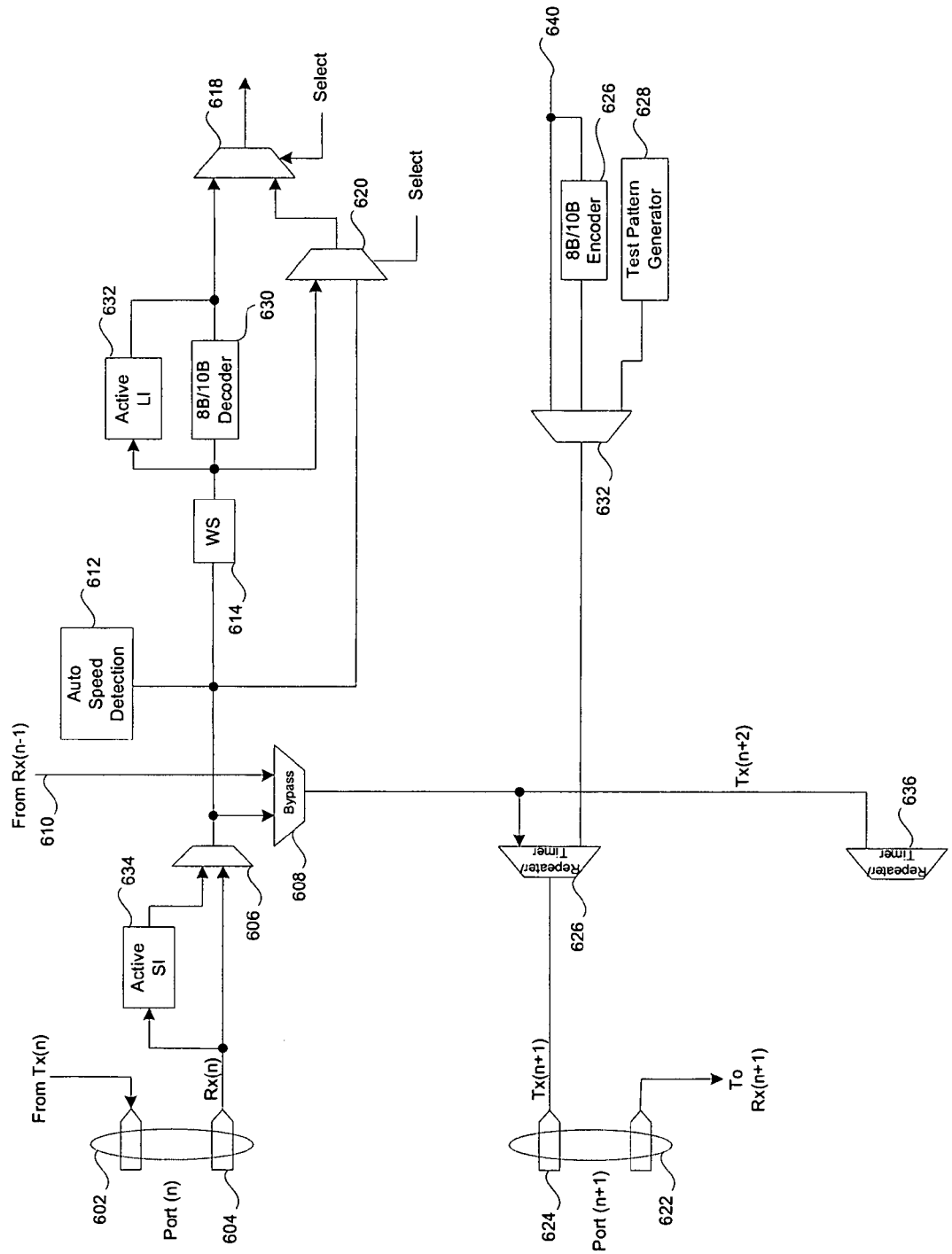
FIG. 6 is a block diagram of an exemplary architecture of an FC-Core repeater port switch for a transmit side and a receive side of the FC-Core repeater/retimer port switch of FIG. 5, for example, which may be utilized in connection with the IBOD device of FIG. 4a, for example, for seamless double switching and a robust EFIFO in a port bypass controller, in accordance with an embodiment of the invention.

FIG. 6 is a block diagram of an exemplary architecture of an FC-Core repeater port switch for a transmit side and a receive side of the FC-Core repeater/retimer port switch of FIG. 5, which may be utilized in connection with the IBOD device of FIG. 4*a* for seamless double switching and a robust EFIFO in a port bypass controller, in accordance with an embodiment of the invention. FIG. 6 illustrates a transmit side of a first port 602 and a receive side of a second consecutive port 622 of the FC-Core repeater/retimer port switch of FIG. 5. Accordingly, FIG. 6 may be utilized to illustrate the operation of the repeater function block 514 illustrated in FIG. 5.

Referring to FIG. 6, there is shown a receive section 604 of port 602. For simplicity, the CDR 522 and interpolator 520 illustrated in FIG. 5 are not shown. Notwithstanding, the receive side may comprise an active signal integrity (SI) block 634, a selector 606, bypass selector 608, auto speed detection block 612, word synchronizer block 614, active line integrity (LI) block 632, 8B/10B decoder 630, selector 618 and selector 620.

Each of the selectors 606, 608, 618 and 620 may comprise suitable logic and/or circuitry that may be adapted to select, enable and/or disable one or more signals that may be coupled thereto. Accordingly, when a signal is received at port 604, the CDR and interpolator (not shown in FIG. 6) may recover the clock and the recovered clock may be utilized to demultiplex the signal. The demultiplexed signal may be passed to the active signal integrity block 634 for processing and/or it may be transferred to the selector 606. This output signal transferred to the selector 606 may be utilized to provide timing for the transmit port Tx(n+1) 624.

The output signal from the selector or MUX 606 may be transferred to the bypass multiplexer or selector 608, and/or the auto speed detection block 612 may determine a data rate of the demultiplexed signal. Once the data rate of the signal has been determined, the resulting timing information may be utilized by the word synchronization (WS) block 614 to align to the word boundaries in the demultiplexed received signal. With regard to port switching, the active line integrity block 632 and the active signal integrity block 634 may not be required.

A resulting signal from the word synchronization (WS) block 614 may be decoded by the 8B/10B decoder block 630 or it may be processed by the active line integrity block 632.

The selector or multiplexer 620 may be adapted to select between an output of the word synchronizer block 614 and non-word synchronized version of the demultiplexed received signal. The selector or multiplexer 618 may be adapted to select between an output of the 8B/10B decoder and the selector 620.

In general, in repeater mode, a signal received at a current port from a prior port in the chain, for example, may be repeated and passed onto a successive port in the chain. The CDR for the current receive port may be adapted to recover the clock signal from the signal received from the prior port in the chain. This recovered clock signal may be passed on to a successive port in the chain where it may be utilized to drive the transmit side of the successive port. In this regard, the output signal from the selector or MUX 606 may be transferred to the bypass selector or multiplexer 608 and upon selection by the bypass selector 608, the signal may be repeated to port 632. In the bypass mode, signal 610 from port Rx(n−1) may bypass port 602 and be transferred to ports 624 and/or Tx(n+2). The bypass selector or multiplexer 608 may also be referred to as a repeater selector or multiplexer. In a case where port 550 is bypassed, the timing may be acquired from a prior port via signal 610. Signal 610 may be derived from, for example, another FC-Core in the chain.

On the receive side, signal 640 may be passed directly to the selector or multiplexer 632 or signal 640 may be 8B10B encoded by the 8B10B encoder block 626. Signal 640 may be a retimed signal, for example. The resulting 8B10B encoded signal may be transferred to the selector 632. The selector or multiplexer 632 may select either the resulting encoded 8B10 signal or the signal 640 may be transferred to the retransmitter/retimer selector 626. The retransmitter/retimer selector 626 may select the output of the selector 632 to be transferred to the transmit port 624. The test pattern generator 628 may be utilized for testing and may be configured to generate test codes and/or patterns such as fibre channel codes, frames and/or ordered sets. Accordingly, when utilized in conjunction with port bypass or switching, any port may be readily tested without the need to reconfigure or initialize the port, or to employ expensive external test equipment.

Figure 7:
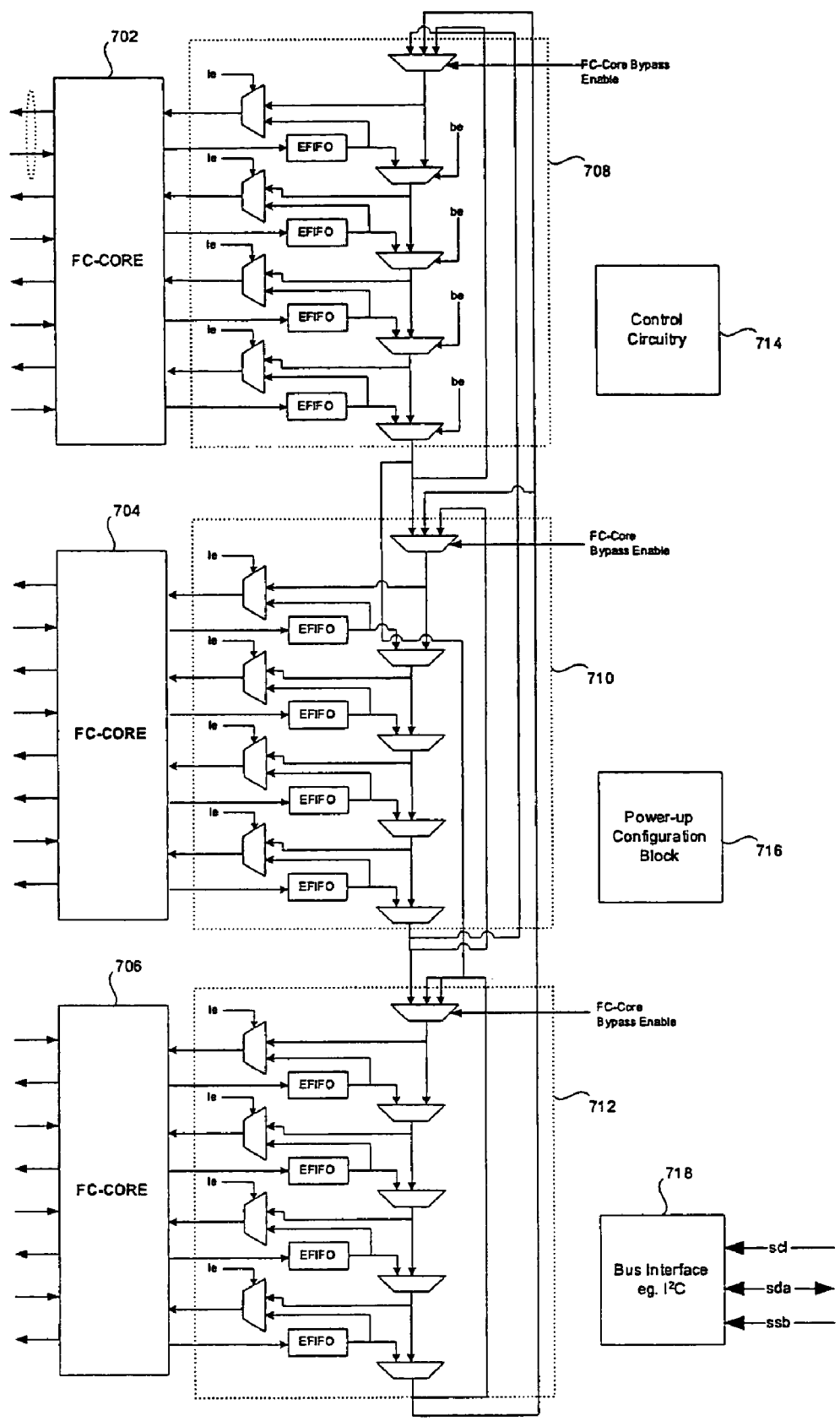
FIG. 7 is a block diagram of an exemplary embodiment of a retimer port switch architecture that may be utilized in connection with the IBOD device of FIG. 4a, for example, for seamless double switching and a robust EFIFO in a port bypass controller, in accordance with an embodiment of the invention.

FIG. 7 is a block diagram of an exemplary embodiment of a retimer port switch architecture that may be utilized in connection with the IBOD device of FIG. 4*a* for seamless double switching and a robust EFIFO in a port bypass controller, in accordance with an embodiment of the invention. Referring to FIG. 7, there is shown FC-Cores 702, 704, 706 and their respective retimer blocks 708, 710, 712, control circuitry block 714, power up configuration block 716, and a bus interface block 718 such as an I²C bus interface.

Figure 8:
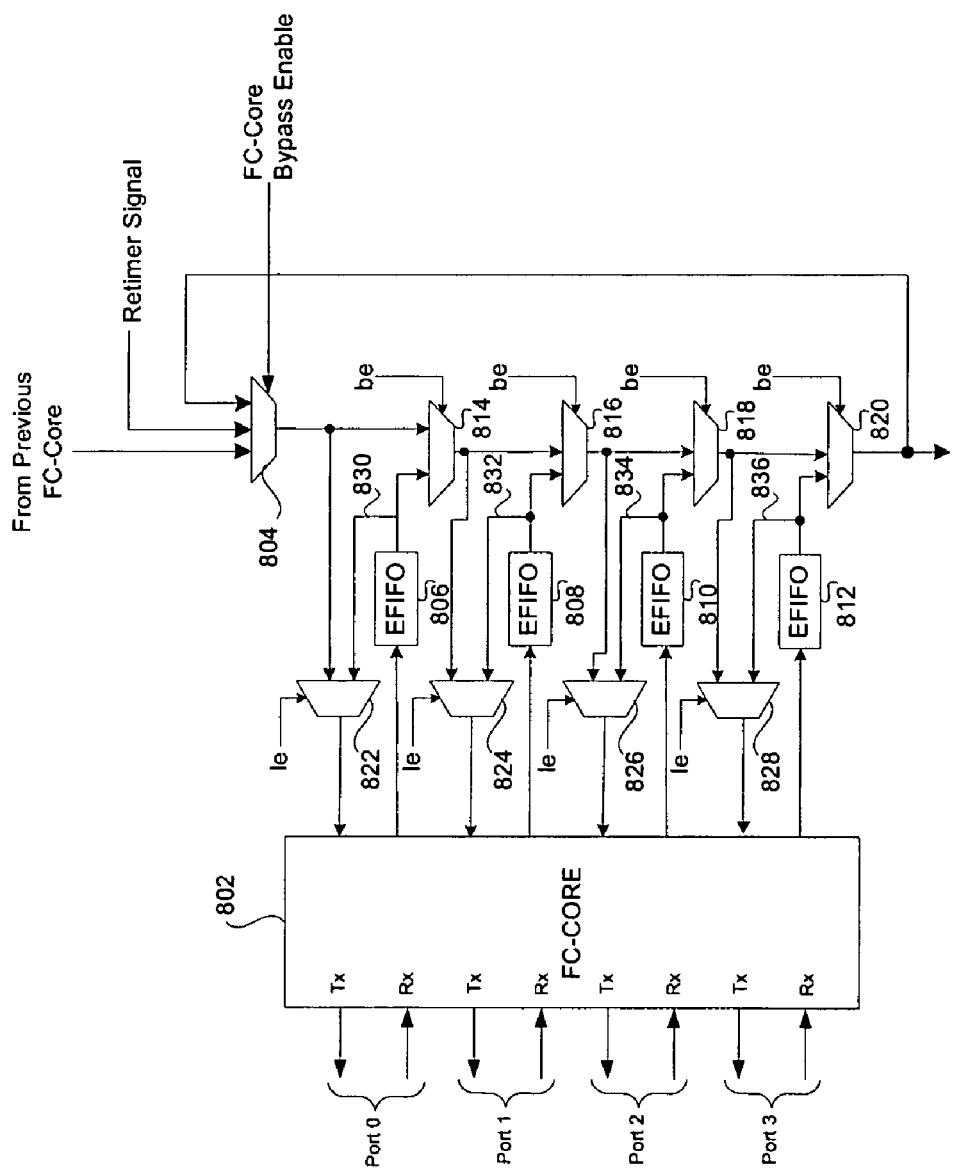
FIG. 8 is a block diagram of a portion of the retimer port switch architecture of FIG. 7 that may be utilized for handling a single FC-Core which may be utilized in connection with the IBOD device of FIG. 4a, for example, for seamless double switching and a robust EFIFO in a port bypass controller, in accordance with an embodiment of the invention.

FIG. 8 is a block diagram of a portion of the retimer port switch architecture of FIG. 7 that may be utilized for handling a single FC-Core which may be utilized in connection with the IBOD device of FIG. 4*a* for seamless double switching and a robust EFIFO in a port bypass controller. Referring to FIG. 8, there is shown FC-Core 802, EFIFOs 806, 808, 810, 812 loopback enable selectors or multiplexers 822, 824, 826, 828, bypass selectors 814, 816, 818, 820 and FC-Core bypass enable selector or multiplexer 804. FIG. 8 further comprises loopback paths 830, 832, 834 and 836.

The FC-Core bypass enable selector or multiplexer 804 may be utilized to enable or disable the ports in the FC-Core. For example, if the FC-Core bypass enable selector 804 is enabled, then any of port 0, port 1, port 2 and port 3 may be active. However, if the FC-Core bypass enable selector 804 is disabled, then all of the FC-Core ports including port 0, port 1, port 2 and port 3 will be inactive. In effect, when the FC-Core bypass enable selector 804 is disabled, then the FC-Core 802 is effectively disabled. Notwithstanding, in the case where the FC-Core bypass enable selector 804 is enabled, then any one or more of the of the port for FC-Core 802 may be bypassed. In this regard, bypass enable (be) selector 814 may be utilized to bypass port 0 and bypass enable selector 816 may be utilized to bypass port 1. Similarly, bypass enable selector 818 may be utilized to bypass port 2 and bypass enable selector 820 may be utilized to bypass port 3.

The loopback enable (le) selector 822 may be utilized to place port 0 in loopback via path 830 and the loopback enable selector 824 may be utilized to place port 1 in loopback via path 832. Similarly, the loopback enable selector 826 may be utilized to place port 2 in loopback via path 834 and the loopback enable selector 828 may be utilized to place port 3 in loopback via path 836. For example, a signal received from port 3 may pass through EFIFO 812 and be loopbacked through path 836. Similarly, a signal received from port 1 may pass through EFIFO 808 and be loopbacked through path 832.

Figure 9:
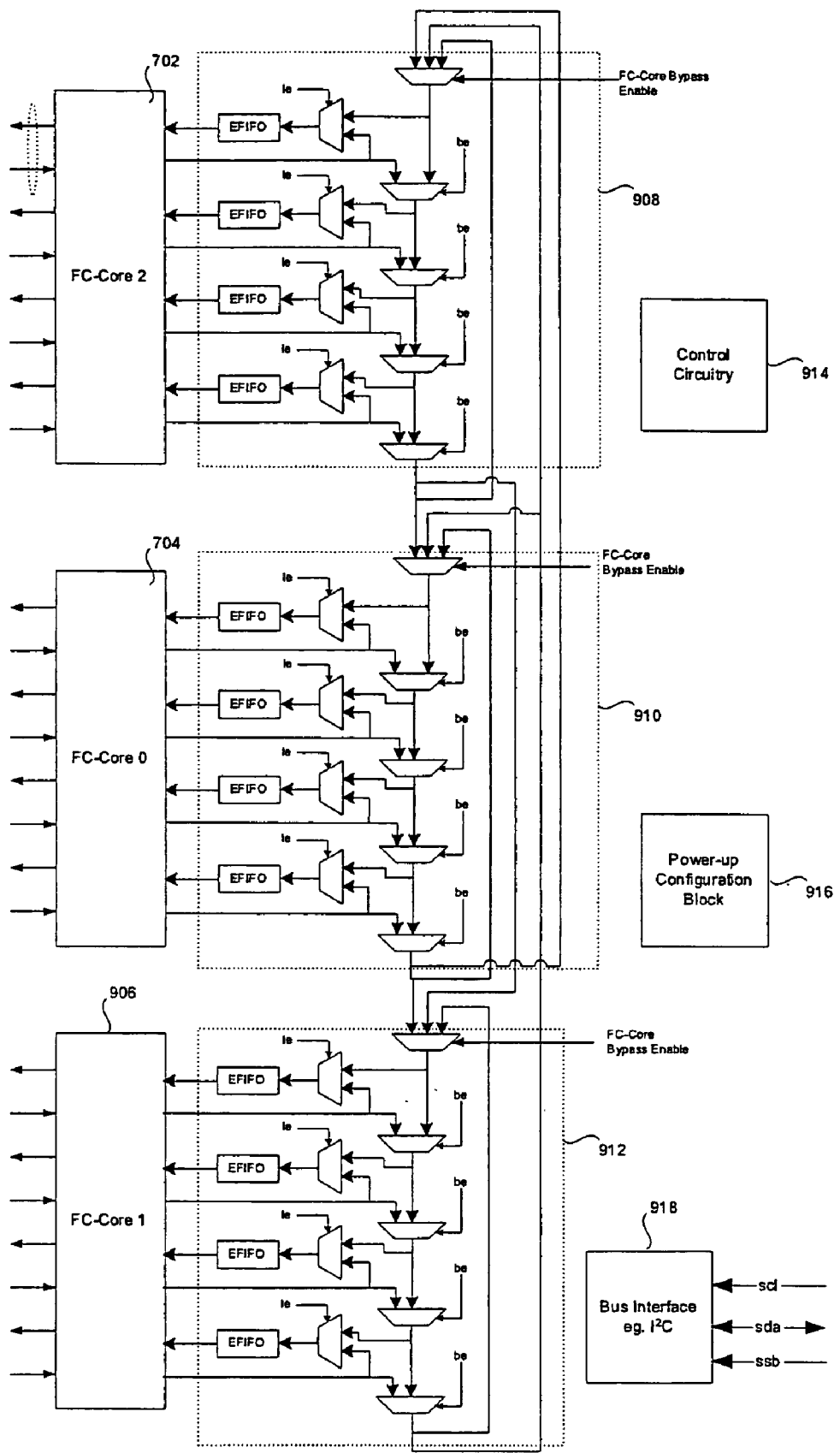
FIG. 9 is a block diagram of another exemplary embodiment of a retimer port switch architecture that may be utilized in connection with the IBOD device of FIG. 4a, for example, for seamless double switching and a robust EFIFO in a port bypass controller, in accordance with an embodiment of the invention.

FIG. 9 is a block diagram of another exemplary embodiment of a retimer port switch architecture that may be utilized in connection with the IBOD device of FIG. 4*a* for seamless double switching and a robust EFIFO in a port bypass controller, in accordance with an embodiment of the invention. Referring to FIG. 9, there is shown FC-Cores 902, 904, 906 and their respective retimer blocks 908, 910, 912, control circuitry block 914, power up configuration block 916, and a bus interface block 918 such as an I²C interface.

Figure 10:
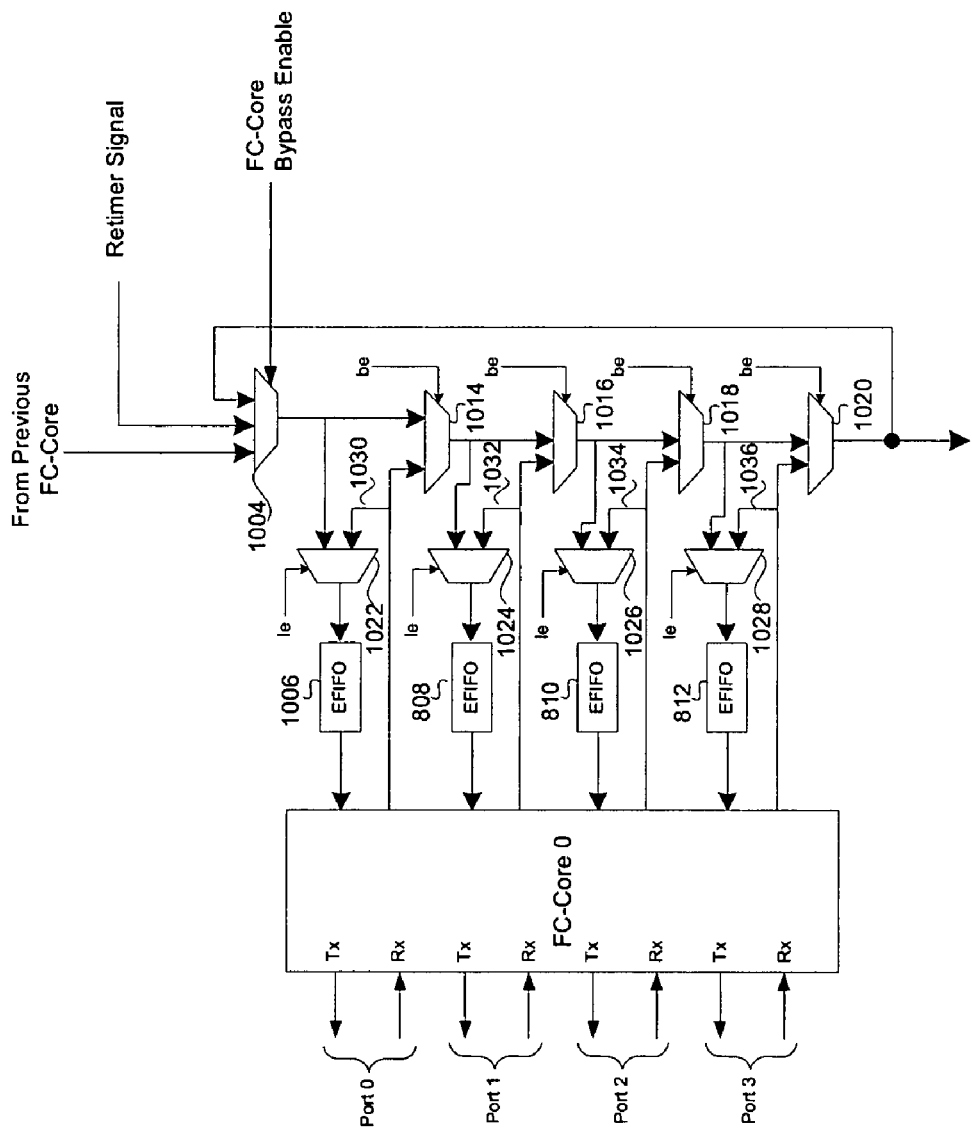
FIG. 10 is a block diagram of a portion of the retimer port switch architecture of FIG. 9, for example, that may be utilized for handling a single FC-Core which may be utilized in connection with the IBOD device of FIG. 4a, for example, for seamless double switching and a robust EFIFO in a port bypass controller, in accordance with an embodiment of the invention.

FIG. 10 is a block diagram of a portion of the retimer port switch architecture of FIG. 9 that may be utilized for handling a single FC-Core which may be utilized in connection with the IBOD device of FIG. 4*a* for seamless double switching and a robust EFIFO in a port bypass controller, in accordance with an embodiment of the invention. Referring to FIG. 10, there is shown FC-Core 1002, EFIFOs 1006, 1008, 1010, 1012, loopback enable selectors or multiplexers 1022, 1024, 1026, 1028, bypass selectors 1014, 1016, 1018, 1020 and FC-Core bypass enable selector or multiplexer 1004. In FIG. 10, the EFIFOs 1006, 1008, 1010, 1012 are configured so that they are located after or at the output of the loopback enable selectors as opposed the FIG. 8 where the EFIFOs 806, 808, 810, 812 are placed before or at the inputs of the bypass selectors 814, 816, 818, 820.

The FC-Core bypass enable (be) selector or multiplexer 1004 may be utilized to enable or disable the ports in the FC-Core. For example, if the FC-Core bypass enable selector 1004 is enabled, then any of port 0, port 1, port 2 and port 3 may be active. However, if the FC-Core bypass enable selector 1004 is disabled, then all of port 0, port 1, port 2 and port 3 will be inactive. In effect, when the FC-Core bypass enable selector 1004 is disabled, then the FC-Core 1002 is effectively disabled. Notwithstanding, in the case where the FC-Core bypass enable selector 1004 is enabled, then any one or more of the ports for FC-Core 1002 may be bypassed. In this regard, bypass enable (be) selector 1014 may be utilized to bypass port 0 and bypass enable selector 1016 may be utilized to bypass port 1. Similarly, bypass enable selector 1018 may be utilized to bypass port 2, and bypass enable selector 1020 may be utilized to bypass port 3.

The loopback enable (le) selector 1022 may be utilized to place port 0 in loopback via path 1030 and the loopback enable selector 1024 may be utilized to place port 1 in loopback via path 1032. Similarly, the loopback enable selector 1026 may be utilized to place port 2 in loopback via path 1034 and the loopback enable selector 1028 may be utilized to place port 3 in loopback via path 1036. For example, a signal received from port 3 may pass through EFIFO 1012 and be loopbacked through path 1036. Similarly, a signal received from port 1 may pass through EFIFO 1008 and be loopbacked through path 1032.

The retimer signal 1040 may be coupled to any of the ports of the FC-Core 1002 whenever the FC-Core bypass enable selector 1004 is enabled. For example, with the FC-Core bypass enable selector 1004 enabled and the bypass selector 1014 enabled, the retimer signal may be coupled to the EFIFO 1008 for port 2. However, in this case, if the bypass selector 1016 is disabled, then the recovered clock from port 2 will be supplied to port 3.

Each of the EFIFOs are designed so that it operates with minimal delay, while at the same time provides significant resilience against signal jitter. For these reasons, the EFIFO may be regarded as a very robust EFIFO. In general, the EFIFO is configured to adjust a signal rate or frequency of an incoming received signal. In this regard, the EFIFO utilizes fill words to speed up or slow down the clock rate or frequency of a received signal via, for example, an insertion or deletion operation. As specified in the fibre channel specification, FIFOs utilized in conventional port bypass controllers relied only IDLE and ARB fill words to speed up or slow down the clock rate or frequency. Notwithstanding, the invention utilizes robust EFIFOs and extended fill word to increase or decrease the rate or frequency of the received data stream. The EFIFO retimes received input data using a cleaner clock signal which may be derived from a reference clock.

Figure 11:
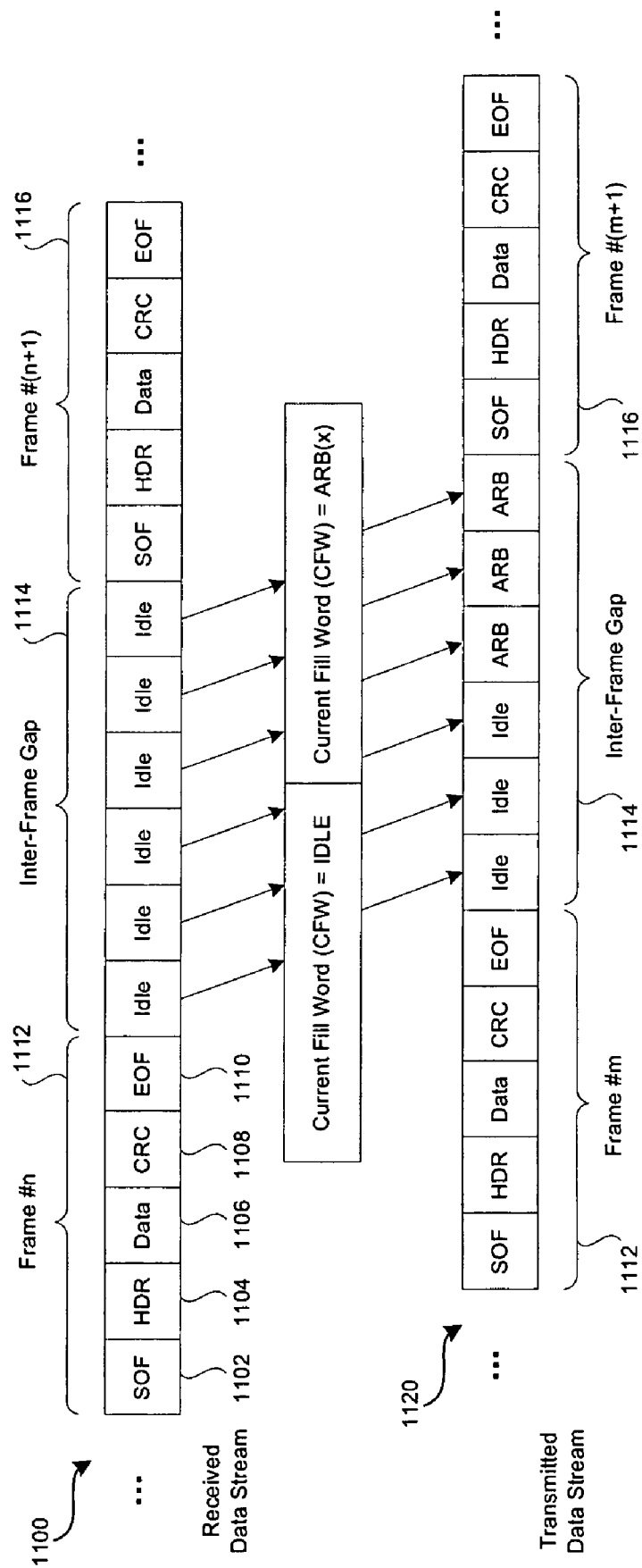
FIG. 11 is a block diagram illustrating insertion of a fill word operation that may be utilized in connection with a robust EFIFO for a port bypass controller, in accordance with an embodiment of the invention.

FIG. 11 is a block diagram illustrating insertion of a fill word operation that may be utilized in connection with a robust EFIFO for a port bypass controller, in accordance with an embodiment of the invention. Referring to FIG. 11, there is shown an exemplary receive data stream 1100 and an exemplary transmit data stream 1120. The exemplary receive data stream 1100 may comprise a first frame #n 1112, an inter-frame gap 1114, and a consecutive frame #(n+1) 1116. Frame #n, for example, may comprise a start of frame (SOF) delimiter 1102, a header (HDR) 1104, a data payload 1106, a cyclic redundancy check (CRC) 1108 and an end of frame delimiter (EOF) 1110. An inter-frame gap 1114 exists between frame #n 1112 and frame #(n+1) 1116. The current fill work may also be an extended fill word. Extended fill words may comprise a loop initialization primitive (LIP), a loop port bypass (LPB), a loop port enable (LPE), a not operation state (NOS), an offline state (OLS), a link reset response (LRR) and a link reset (LR).

The transmitted data stream 1120 may comprise a frame #m 1122, frame #(m+1) 1126 and inter-frame gap 1124. The transmitted data stream 1120 may be generated by buffering the received frame and inserting fill words into the inter-frame gap 1124 or deleting fill words from the inter-frame gap 1124. In the inter-frame gap 1124, the current fill word which is an ARB fill word is inserted after the three consecutive idles in the inter-gap frame 1124.

Figure 12:
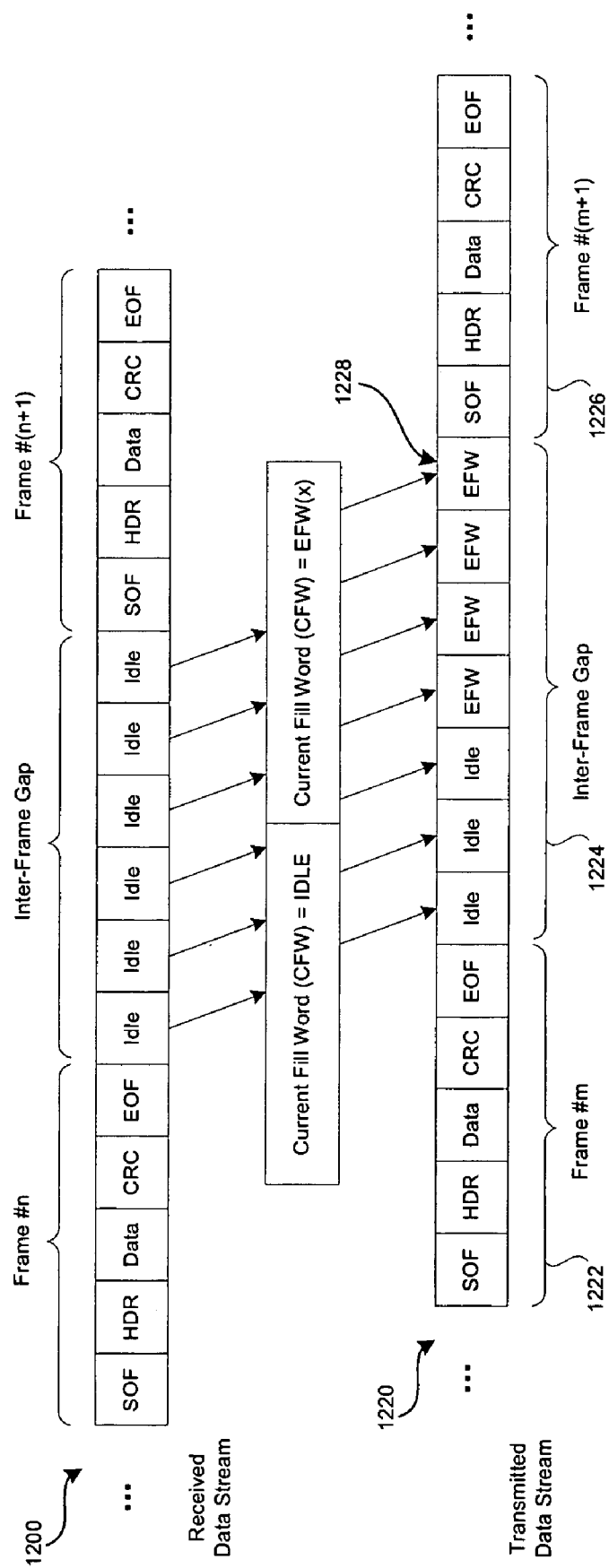
FIG. 12 is a block diagram illustrating insertion of an extended fill word (EFW) operation that may be utilized in connection with a robust EFIFO for a port bypass controller, in accordance with an embodiment of the invention.

FIG. 12 is a block diagram illustrating insertion of an extended fill word (EFW) operation that may be utilized in connection with a robust EFIFO for a port bypass controller, in accordance with an embodiment of the invention. Referring to FIG. 12, there is shown an exemplary receive data stream 1200 and an exemplary transmit data stream 1220. The exemplary transmit data stream 1220 may comprise frame #m 1222 and frame #(m+1) 1226. An inter-frame gap 1224 exists between frame #m 1212 and frame #(m+1) 1226. In the inter-gap frame 1224, the current fill word which is designated EFW(x) is inserted after the three consecutive idles in the inter-gap frame 1124. An additional extended fill work 1228 may also be inserted in the inter-frame gap 1224. The extended fill word (EFW) may represent any one or a combination of a loop initialization primitive (LIP), a loop port bypass (LPB), a loop port enable (LPE), a not operation state (NOS), an offline state (OLS), a link reset response (LRR) and/or a link reset (LR).

Figure 13:
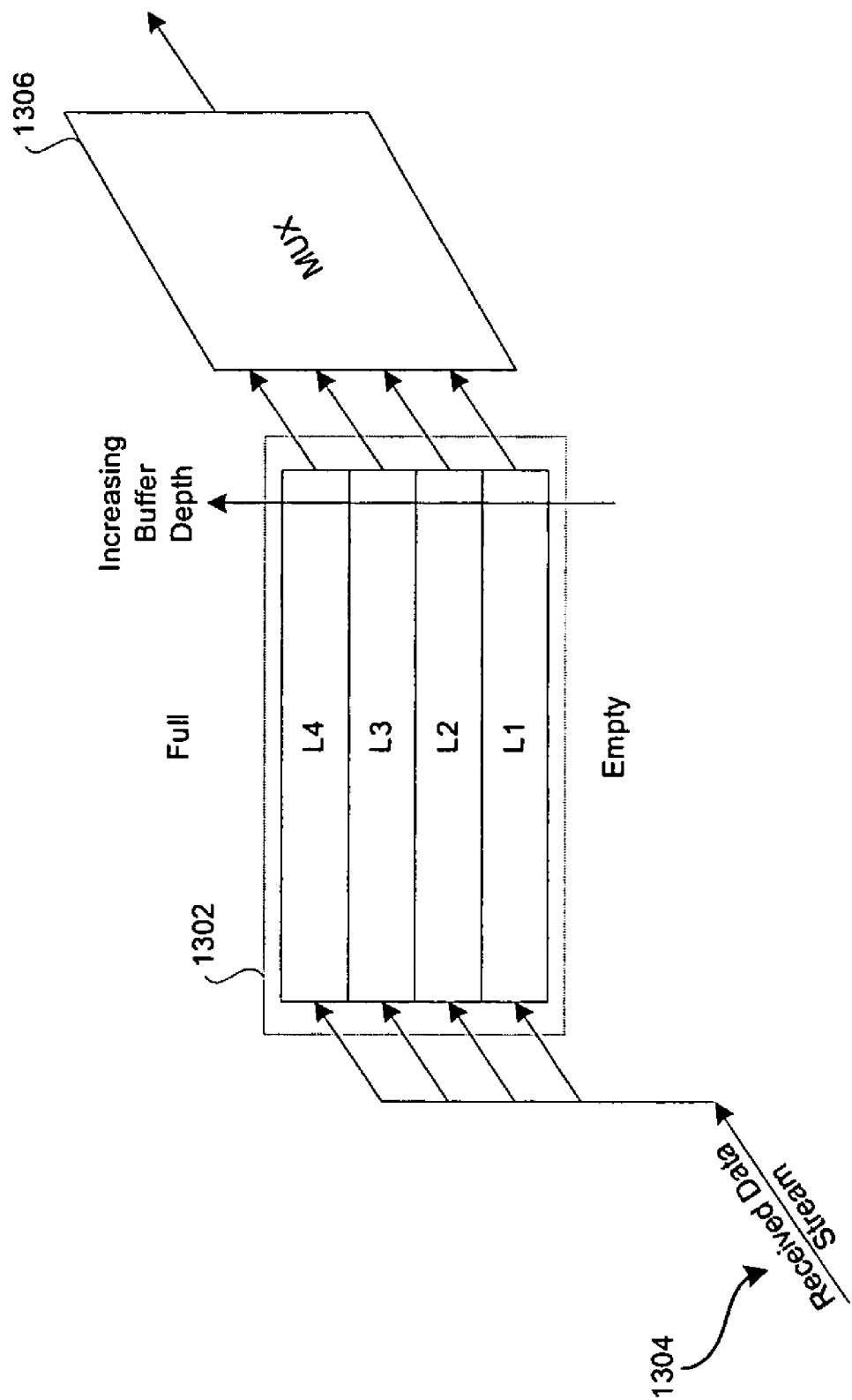
FIG. 13 illustrates a block diagram of an exemplary EFIFO having a plurality of levels that may be utilized in a port bypass controller in accordance with an embodiment of the invention

FIG. 13 illustrates a block diagram of an exemplary EFIFO having a plurality of levels that may be utilized in a port bypass controller in accordance with an embodiment of the invention. Referring to FIG. 13, there is shown an EFIFO 1302, a received data stream 1304 and a multiplexer (MUX) 1306. The EFIFO 1302 may comprise a plurality of levels. For example, the EFIFO 1302 may comprise level 1 (L1), level 2 (L2), level 3 (L3), and level 4 (L4). Level 1 (L1) may be an insertion pending level, level 2 (L2) may be a quiescent level, level 3 (L3) may be a low priority deletion pending level, and level 4 (L4) may be a high priority deletion pending level. The insertion pending level (L1) may implement a buffer space of at least one-half (½) of a fill word in the EFIFO buffer 1302. The quiescent level (L2) and/or the low priority deletion pending level (L3) may be adapted to implement a buffer space of at least one fill word in the EFIFO buffer 1302. At least a portion of the received data stream 1304 may be buffered in one or more levels L1, L2, L3, L4 in the EFIFO buffer 1302.

In operation, with regard to insertion, if data from the received data stream 1304 is only in level 1 (L1) of the EFIFO buffer, a current extended fill word may be inserted immediately after any of the extended fill word. In this regard, the current extended fill word may be a standard fill word and/or an extended fill word. A standard fill word is an IDLE or an ARB.

With regard to low priority delete operations, if data from the received data stream 1304 is in the low priority deletion pending level (L3) in the EFIFO buffer 1302, then if after about four (4) extended fill words there is no intervening non-ordered set, a next extended fill word may be deleted. Furthermore, if data from the received data stream is in the low priority deletion pending level (L3) in the EFIFO buffer 1302, then if a current fill word changes to idle while there is at least one delete pending, a first of the idle may be deleted. After executing a low priority deletion, the low priority deletion pending level (L3) of the EFIFO buffer may be entered and a waiting period of four (4) extended fill words may elapse before executing another deletion. Other waiting periods greater that or less than four (4) fill words may be utilized without departing from the various aspects of the invention. Furthermore, after executing a low priority deletion, the quiescent level (L2) of the EFIFO buffer 1302 may be entered whenever there is no deletion pending.

With regard to high priority delete operations, if data from the received data stream 1304 reaches the high priority deletion pending level (L4), then if after about two (2) extended fill words there is no intervening non-ordered set, a next extended fill word may be deleted. More than or less that two (2) extended fill words may also be utilized. Furthermore, if data from the received data stream 1304 reaches the high priority deletion pending level (L4), then if a current fill word changes to idle while at least one delete is pending, a first of the idle may be skipped without deleting the first idle. After executing a high priority word delete, the low priority deletion pending level (L3) may be entered after waiting for about four (4) extended fill words before executing another delete. More or less than four (4) extended fill words may be utilized. Furthermore, after executing a high priority word delete, the high priority deletion pending level (L4) may be re-entered after waiting for about two (2) extended fill words before executing another delete. More or less than two (2) extended fill words may be utilized. In this case, the delete may be executed if there is sufficient space available in the EFIFO buffer 1302.

The method may further comprise multiplexing an output steam from each of the levels in the EFIFO buffer 1302 via the MUX 1306. If an collision occurs in the EFIFO buffer 1302, one or more interrupts may be generated by the PBC's controller or CPU 438 of FIG. 4. The interrupt may be generated to as host system or processor.

Figure 14A:
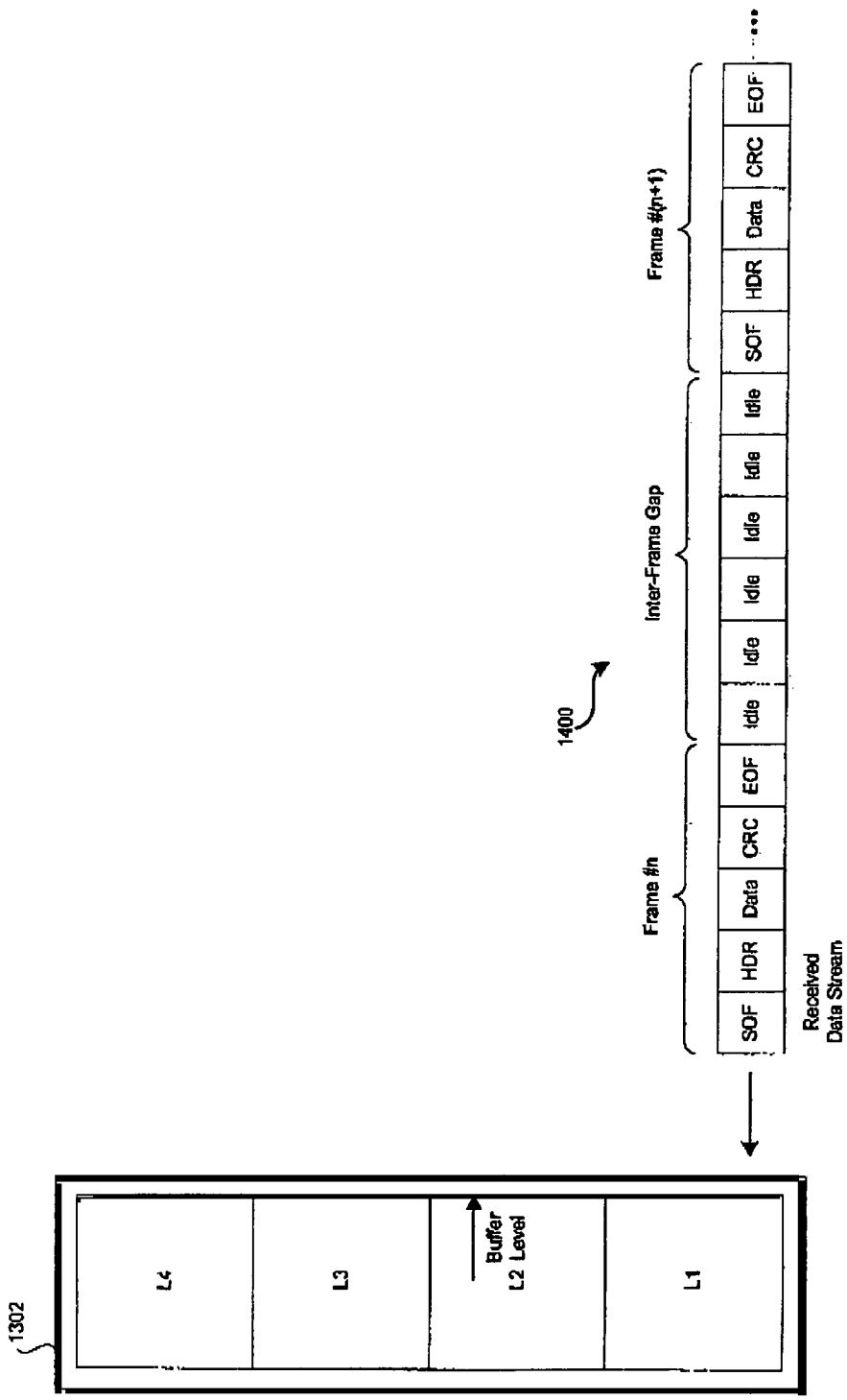
FIG. 14A illustrates a block diagram of an exemplary EFIFO receiving a data stream with an L2 current buffer level, in accordance with an embodiment of the invention.

FIG. 14A illustrates a block diagram of an exemplary EFIFO receiving a data stream with an L2 current buffer level, in accordance with an embodiment of the invention. Referring to FIG. 14A, there is shown an EFIFO 1302, and a received data stream 1400. FIG. 14A illustrates a buffer fill state for the EFIFO 1302 at a given time instant. In FIG. 14A, the current buffer level is within the L2 buffer level as indicated.

Figure 14B:
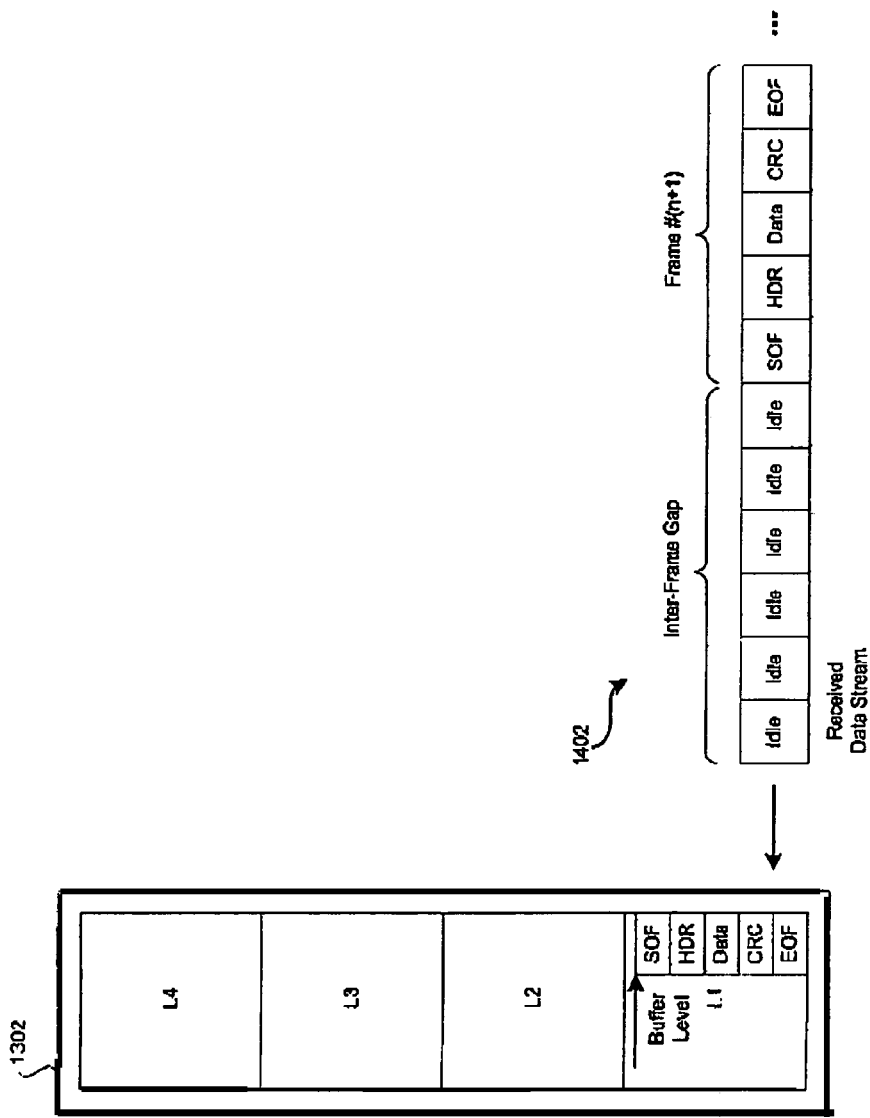
FIG. 14B illustrates a block diagram of an exemplary EFIFO receiving a data stream with an L1 current buffer level, in accordance with an embodiment of the invention.

FIG. 14B illustrates a block diagram of an exemplary EFIFO receiving a data stream with an L1 current buffer level, in accordance with an embodiment of the invention. Referring to FIG. 14B, there is shown an EFIFO 1302, and a received data stream 1404. FIG. 14B illustrates a received data stream 1404 and a buffer fill state for the EFIFO 1302 at a subsequent time instant from FIG. 14A. In FIG. 14B, the current buffer fill level is within the L1 buffer level as indicated.

Figure 14C:
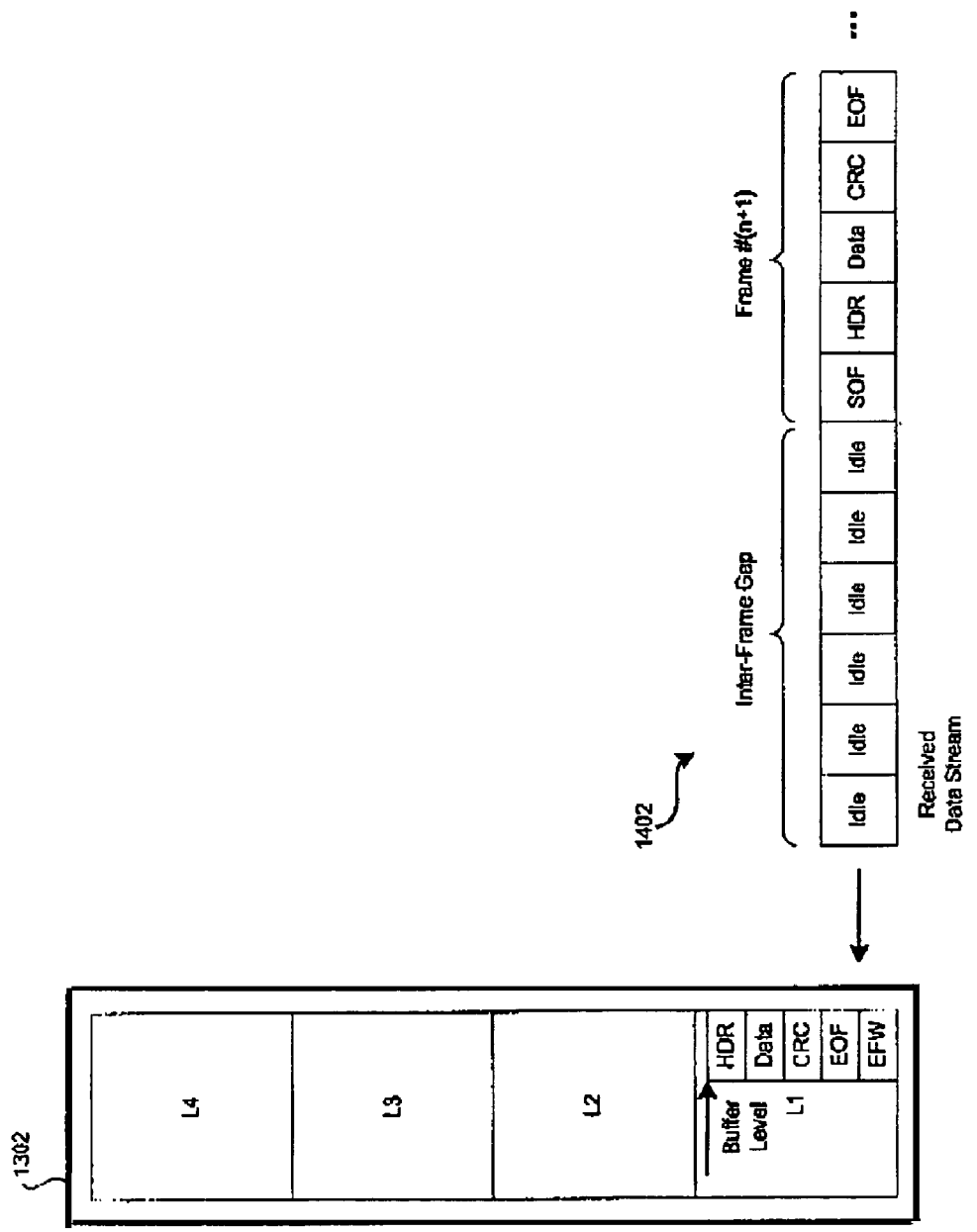
FIG. 14C illustrates an exemplary result of insertion of an extended fill word in an EFIFO with an L1 current buffer level, in accordance with an embodiment of the invention.

FIG. 14C illustrates an exemplary result of insertion of an extended fill word in an EFIFO with an L1 current buffer level, in accordance with an embodiment of the invention. Referring to FIG. 14C, there is shown an EFIFO 1302, a received data stream 1404 and an inserted extended fill word 1406. FIG. 14C illustrates the received data stream 1404 and a buffer fill state for the EFIFO 1302 at a subsequent time instant from FIG. 14B. In FIG. 14C, an extended fill word 1406 has been inserted in the EFIFO 1302.

Figure 14D:
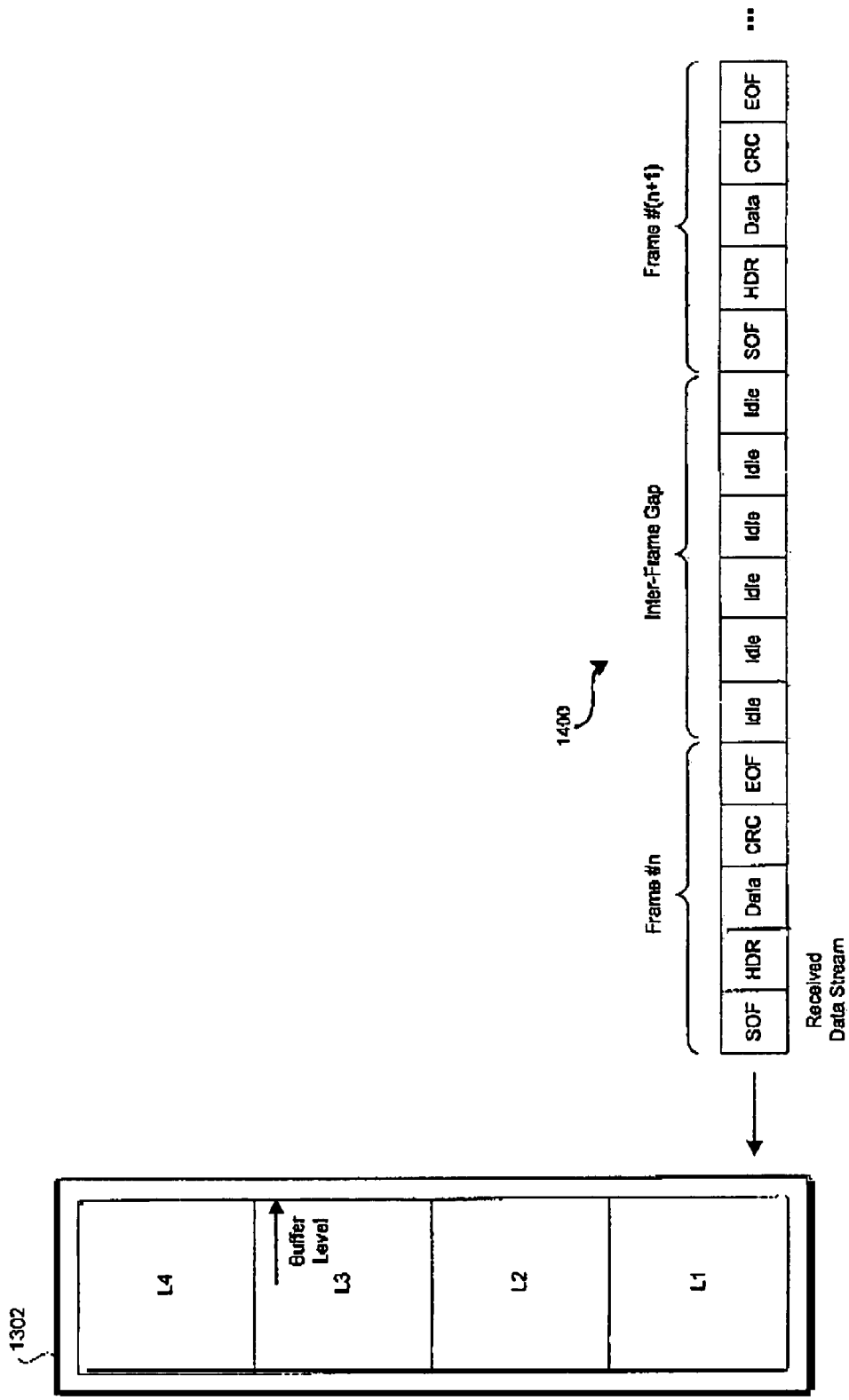
FIG. 14D illustrates a block diagram of an exemplary EFIFO receiving a data stream with an L3 current buffer level, in accordance with an embodiment of the invention.

FIG. 14D illustrates a block diagram of an exemplary EFIFO receiving a data stream with an L3 current buffer level, in accordance with an embodiment of the invention. Referring to FIG. 14D, there is shown an EFIFO 1302, and a received data stream 1400. FIG. 14D illustrates a buffer fill state for the EFIFO 1302 at a given time instant. In FIG. 14D, the current buffer level is within the L3 buffer level as indicated.

Figure 14E:
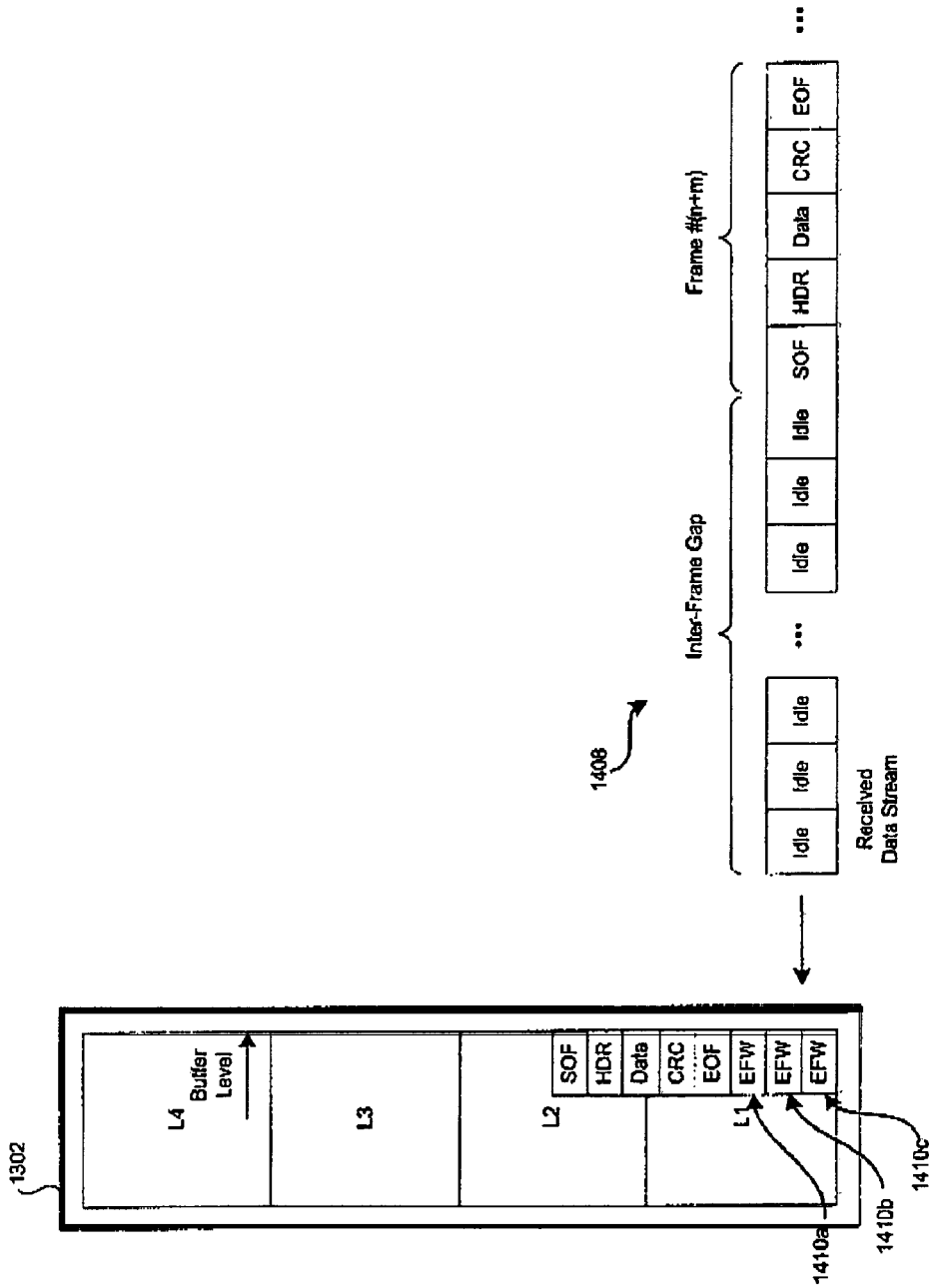
FIG. 14E illustrates a block diagram of an exemplary EFIFO receiving a data stream with an L4 current buffer level, in accordance with an embodiment of the invention.

FIG. 14E illustrates a block diagram of an exemplary EFIFO receiving a data stream with an L4 current buffer level, in accordance with an embodiment of the invention. Referring to FIG. 14E, there is shown an EFIFO 1302, a received data stream 1408, and a plurality of extended fill words 1410*a*, 1410*b*, and 1410*c*. FIG. 14E illustrates a received data stream 1404 and a buffer fill state for the EFIFO 1302 at a subsequent time instant from FIG. 14D. In FIG. 14E, the current buffer fill level is within the L4 buffer level as indicated. The EFIFO 1302 comprises the extended fill words 1410*a*, 1410*b*, and 1410*c*.

Figure 14F:
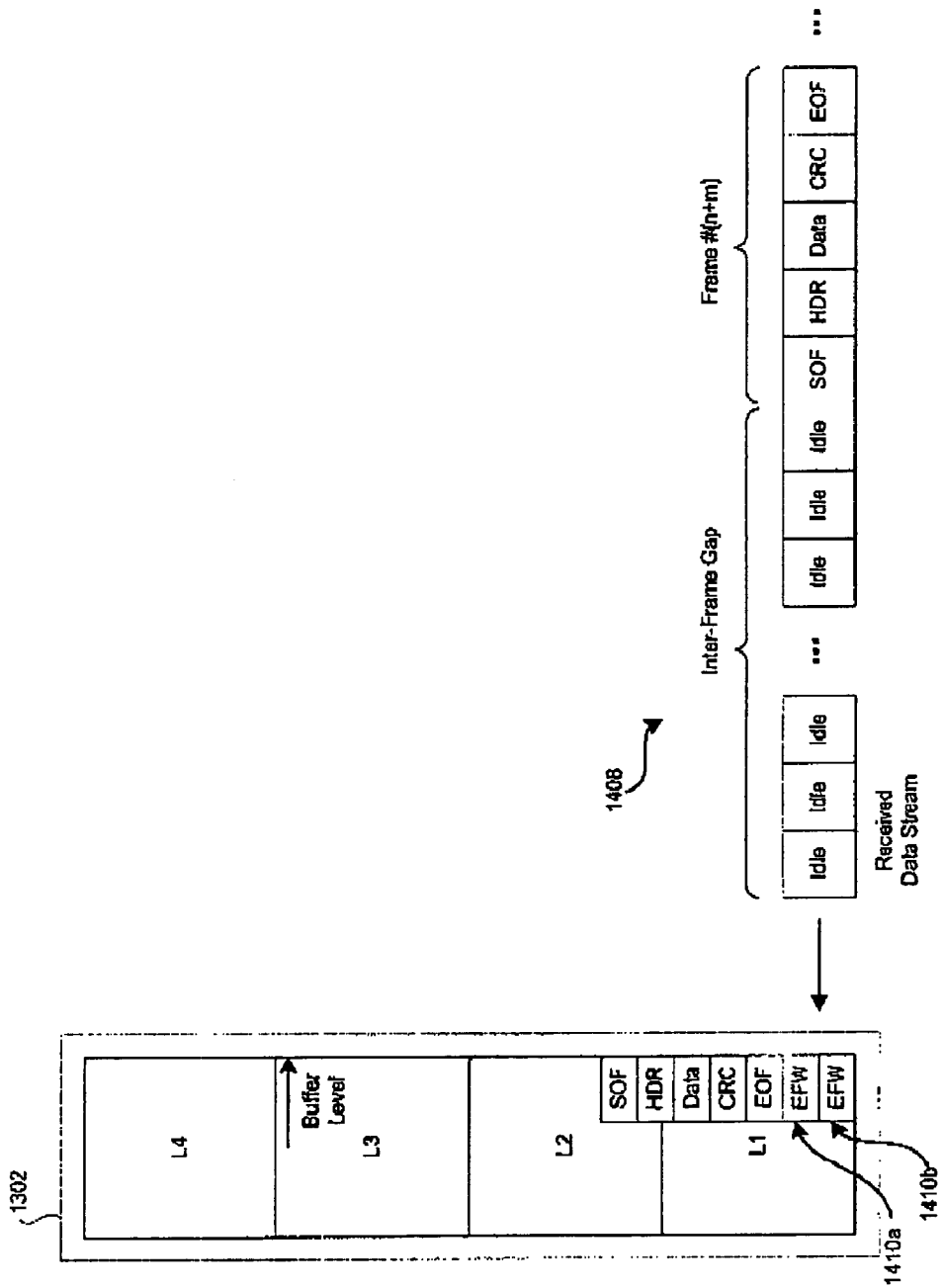
FIG. 14F illustrates an exemplary result of deletion of an extended fill word from an EFIFO, in accordance with an embodiment of the invention.

FIG. 14F illustrates an exemplary result of deletion of an extended fill word from an EFIFO, in accordance with an embodiment of the invention. Referring to FIG. 14F, there is shown an EFIFO 1302, a received data stream 1408, and a plurality of extended fill words 1410*a*, and 1410*b*. FIG. 14F illustrates the received data stream 1408 and a buffer fill state for the EFIFO 1302 at a subsequent time instant from FIG. 14E. In FIG. 14E, an extended fill word 1410*c*, illustrated in FIG. 14E, has been deleted from the EFIFO 1302.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for handling data, the method comprising:
generating a retimed data stream by buffering a received data stream in an elastic first in first out buffer;
identifying a plurality of individual slice segments within said generated retimed data stream based on phase interpolation of said generated retimed data stream;
computing one or more bit error rate metrics for each of said plurality of identified individual slice segments; and
determining an operational state based on said computed one or more bit error rate metrics, wherein a single frame transported within said generated retimed data stream comprises at least a portion of two or more of said plurality of individual slice segments.

2. The method according to claim 1, comprising generating said retimed data stream by inserting one or more loop initialization primitives at said elastic first in first out buffer.

3. The method according to claim 2, comprising computing said one or more bit error rate metrics based on said inserting.

4. The method according to claim 1, comprising selecting a plurality of programmable signal levels for detecting signal amplitudes for signals that carry said generated retimed data stream.

5. The method according to claim 4, comprising determining individual bit values within each of said plurality of identified individual slice segments based on said selected plurality of programmable signal levels.

6. The method according to claim 5, comprising determining the presence of said bit errors in said each of said plurality of identified individual slice segments based on said determined individual bit values.

7. The method according to claim 6, comprising generating a decoded data stream by decoding said generated retimed data stream.

8. The method according to claim 1, comprising identifying a plurality of decoded individual slice segments within said generated retimed data stream.

9. The method according to claim 8, comprising monitoring each of said plurality of decoded individual slice segments to detect bit errors.

10. The method according to claim 9, comprising computing said one or more bit error rate metrics based on said monitoring of said each of said plurality of decoded individual slice segments.

11. The method according to claim 1, comprising monitoring said generated retimed data stream to detect ordered set violations.

12. The method according to claim 11, comprising determining said operational state based on a sum of said detected ordered set violations.

13. The method according to claim 1, comprising monitoring said generated retimed data stream to detect cyclical redundancy check errors within each said single frame.

14. The method according to claim 13, comprising determining said operational state based on a sum of said detected cyclical redundancy check errors.

15. The method according to claim 1, comprising computing one or more accumulated error sums based on said computed one or more bit error rate metrics.

16. The method according to claim 15, comprising determining said operational state based on one or more of said computed one or more accumulated error sums.

17. A computer readable storage medium having stored thereon, a computer program having at least one code section for handling data, the at least one code section executable by a computer for causing the computer to perform steps comprising:
  generating a retimed data stream by buffering a received data stream in an elastic first in first out buffer;
  identifying a plurality of individual slice segments within said generated retimed data stream based on phase interpolation of said generated retimed data stream;
  computing one or more bit error rate metrics for each of said plurality of identified individual slice segments; and
  determining an operational state based on said computed one or more bit error rate metrics;
  wherein a single frame transported within said generated retimed data stream comprises at least a portion of two or more of said plurality of individual slice segments.

18. The computer readable storage medium according to claim 17, wherein said at least code section comprises code for generating said retimed data stream by inserting one or more loop initialization primitives at said elastic first in first out buffer.

19. The computer readable storage medium according to claim 18, wherein said at least one code section comprises code for computing said one or more bit error rate metrics based on said inserting.

20. The computer readable storage medium according to claim 17, wherein said at least one code section comprises code for selecting a plurality of programmable signal levels for detecting signal amplitudes for signals that carry said generated retimed data stream.

21. The computer readable storage medium according to claim 20, wherein said at least one code section comprises code for determining individual bit values within each of said plurality of identified individual slice segments based on said selected plurality of programmable signal levels.

22. The computer readable storage medium according to claim 21, wherein said at least one code section comprises code for determining the presence of said bit errors in said each of said plurality of identified individual slice segments based on said determined individual bit values.

23. The computer readable storage medium according to claim 22, wherein said at least one code section comprises code for generating a decoded data stream by decoding said generated retimed data stream.

24. The computer readable storage medium according to claim 17, wherein said at least one code section comprises code for identifying a plurality of decoded individual slice segments within said generated retimed data stream.

25. The computer readable storage medium according to claim 24, wherein said at least one code section comprises code for monitoring each of said plurality of decoded individual slice segments to detect bit errors.

26. The computer readable storage medium according to claim 25, wherein said at least one code section comprises code for computing said one or more bit error rate metrics based on said monitoring of said each of said plurality of decoded individual slice segments.

27. The computer readable storage medium according to claim 17, wherein said at least one code section comprises code for monitoring said generated retimed data stream to detect ordered set violations.

28. The computer readable storage medium according to claim 27, wherein said at least one code section comprises code for determining said operational state based on a sum of said detected ordered set violations.

29. The computer readable storage medium according to claim 17, wherein said at least one code section comprises code for monitoring said generated retimed data stream to detect cyclical redundancy check errors within each said single frame.

30. The computer readable storage medium according to claim 29, wherein said at least one code section comprises code for determining said operational state based on a sum of said detected cyclical redundancy check errors.

31. The computer readable storage medium according to claim 17, wherein said at least one code section comprises code for computing one or more accumulated error sums based on said computed one or more bit error rate metrics.

32. The computer readable storage medium according to claim 31, wherein said at least one code section comprises code for determining said operational state based on one or more of said computed one or more accumulated error sums.

33. A system for handling data, the system comprising:
  one or more circuits comprising an elastic first in first out buffer, wherein said one or more circuits enable generation of a retimed data stream by buffering a received data stream in said elastic first in first out buffer;
  said one or more circuits enable identification of a plurality of individual slice segments within said generated retimed data stream based on phase interpolation of said generated retimed data stream;
  said one or more circuits enable computation of one or more bit error rate metrics for each of said plurality of identified individual slice segments; and
  said one or more circuits enable determination of an operational state based on said computed one or more bit error rate metrics;
  wherein a single frame transported within said generated retimed data stream comprises at least a portion of two or more of said plurality of individual slice segments.

34. The system according to claim 33, wherein said one or more circuits enable generation of said retimed data stream by inserting one or more loop initialization primitives at said elastic first in first out buffer.

35. The system according to claim 34, wherein said one or more circuits enable computation of said one or more bit error metrics based on said inserting.

36. The system according to claim 33, wherein said one or more circuits enable selection of a plurality of programmable signal levels for detecting signal amplitudes for signals that carry said generated retimed data stream.

37. The system according to claim 36, wherein said one or more circuits enable determination of individual bit values within each of said plurality of identified individual slice segments based on said selected plurality of programmable signal levels.

38. The system according to claim 37, wherein said one or more circuits enable determination of the presence of said bit errors in said each of said plurality of identified individual slice segments based on said determined individual bit values.

39. The system according to claim 38, wherein said one or more circuits enable generation of a decoded data stream by decoding said generated retimed data stream.

40. The system according to claim 33, wherein said one or more circuits enable identification of a plurality of decoded individual slice segments within said generated retimed data stream.

41. The system according to claim 40, wherein said one or more circuits enable monitoring of each of said plurality of decoded individual slice segments to detect bit errors.

42. The system according to claim 41, wherein said one or more circuits enable computation of said one or more bit error rate metrics based on said monitoring of said each of said plurality of decoded individual slice segments.

43. The system according to claim 33, wherein said one or more circuits enable monitoring of said generated retimed data stream to detect ordered set violations.

44. The system according to claim 43, wherein said one or more circuits enable determination of said operational state based on a sum of said detected ordered set violations.

45. The system according to claim 33, wherein said one or more circuits enable monitoring of said generated retimed data stream to detect cyclical redundancy check errors within each said single frame.

46. The system according to claim 45, wherein said one or more circuits enable determination of said operational state based on a sum of said detected cyclical redundancy check errors.

47. The system according to claim 33, wherein said one or more circuits enable computation of one or more accumulated error sums based on said computed one or more bit error rate metrics.

48. The system according to claim 47, wherein said one or more circuits enable determination of said operational state based on one or more of said computed one or more accumulated error sums.

49. The system according to claim 33, wherein said one or more circuits comprises at least one host processor.

* * * * *